US008751844B2

(12) United States Patent
Mazzaferri et al.

(10) Patent No.: US 8,751,844 B2
(45) Date of Patent: Jun. 10, 2014

(54) SYSTEMS AND METHODS FOR ATTRIBUTING AN AMOUNT OF POWER CONSUMPTION TO A WORKLOAD

(75) Inventors: Richard James Mazzaferri, Mooney Mooney (AU); Paul Ryman, Dural (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 569 days.

(21) Appl. No.: 12/566,019

(22) Filed: Sep. 24, 2009

(65) Prior Publication Data

US 2011/0072293 A1 Mar. 24, 2011

(51) Int. Cl.
*G06F 1/26* (2006.01)
*G06F 1/32* (2006.01)

(52) U.S. Cl.
USPC ............ 713/340; 713/300; 713/320; 713/322

(58) Field of Classification Search
USPC .................................. 713/300, 320, 322, 340
See application file for complete search history.

(56) References Cited

U.S. PATENT DOCUMENTS

| | | | |
|---|---|---|---|
| 7,035,907 B1 | 4/2006 | Decasper et al. |
| 7,042,454 B1 | 5/2006 | Seligman |
| 7,047,411 B1 | 5/2006 | DeMello et al. |
| 7,047,498 B2 | 5/2006 | Lui et al. |
| 7,051,080 B1 | 5/2006 | Paul et al. |
| 7,054,465 B2 | 5/2006 | Rhoads |
| 7,054,818 B2 | 5/2006 | Sharma et al. |
| 7,055,169 B2 | 5/2006 | Delpuch et al. |
| 7,058,697 B2 | 6/2006 | Rhoads |
| 7,062,527 B1 | 6/2006 | Tyrrell, III |
| 7,064,681 B2 | 6/2006 | Horstemeyer |
| 7,069,186 B2 | 6/2006 | Jung et al. |
| 7,069,395 B2 | 6/2006 | Camacho et al. |
| 7,070,098 B1 | 7/2006 | Lapstun et al. |
| 7,072,934 B2 | 7/2006 | Helgeson et al. |
| 7,075,643 B2 | 7/2006 | Holub |
| 7,079,639 B2 | 7/2006 | Smith |
| 7,080,140 B2 | 7/2006 | Heitman et al. |

(Continued)

FOREIGN PATENT DOCUMENTS

| | | |
|---|---|---|
| WO | WO-95/02236 | 1/1995 |
| WO | WO-99/44121 | 9/1999 |
| WO | WO-03/075116 | 9/2003 |
| WO | WO-2005/114375 | 12/2005 |

OTHER PUBLICATIONS

Ainsworth et al, IBM "Going green with IBM systems director active energy manager", Sep. 2008.

(Continued)

*Primary Examiner* — Vincent Tran
(74) *Attorney, Agent, or Firm* — Foley and Lardner LLP; John D. Lanza

(57) ABSTRACT

A method for attributing a portion of a level of electrical power consumption by a server to a virtual machine executing on the server, includes determining a level of electrical power consumption of a server. The method includes identifying a level of load placed on the server by a workload executing on the server. The method includes attributing, by a power apportionment module in communication with the server, a portion of the level of electrical power consumption of the server to the workload, based on the identified level of load. The method includes providing, by the power apportionment module, to a user, an identification of the attributed portion of the level of electrical power consumption.

39 Claims, 8 Drawing Sheets

(56) References Cited

U.S. PATENT DOCUMENTS

| | | |
|---|---|---|
| 7,085,683 B2 | 8/2006 | Anderson et al. |
| 7,089,583 B2 | 8/2006 | Mehra et al. |
| 7,103,197 B2 | 9/2006 | Rhoads |
| 7,107,285 B2 | 9/2006 | Von Kaenel et al. |
| 7,107,309 B1 | 9/2006 | Geddes et al. |
| 7,110,982 B2 | 9/2006 | Feldman et al. |
| 7,113,110 B2 | 9/2006 | Horstemeyer |
| 7,113,596 B2 | 9/2006 | Rhoads |
| 7,113,614 B2 | 9/2006 | Rhoads |
| 7,113,779 B1 | 9/2006 | Fujisaki |
| 7,116,781 B2 | 10/2006 | Rhoads |
| 7,116,894 B1 | 10/2006 | Chatterton |
| 7,117,170 B1 | 10/2006 | Bennett et al. |
| 7,117,504 B2 | 10/2006 | Smith et al. |
| 7,119,716 B2 | 10/2006 | Horstemeyer |
| 7,120,872 B2 | 10/2006 | Thacker |
| 7,124,101 B1 | 10/2006 | Mikurak |
| 7,127,525 B2 | 10/2006 | Coleman et al. |
| 7,130,807 B1 | 10/2006 | Mikurak |
| 7,137,077 B2 | 11/2006 | Iwema et al. |
| 7,137,124 B2 | 11/2006 | Lamb et al. |
| 7,139,983 B2 | 11/2006 | Kelts |
| 7,149,698 B2 | 12/2006 | Guheen et al. |
| 7,152,207 B1 | 12/2006 | Underwood et al. |
| 7,154,638 B1 | 12/2006 | Lapstun et al. |
| 7,155,676 B2 | 12/2006 | Land et al. |
| 7,158,953 B1 | 1/2007 | DeMello et al. |
| 7,165,041 B1 | 1/2007 | Guheen et al. |
| 7,171,016 B1 | 1/2007 | Rhoads |
| 7,171,468 B2 | 1/2007 | Yeung et al. |
| 7,171,624 B2 | 1/2007 | Baldwin et al. |
| 7,173,538 B2 | 2/2007 | Pedraza et al. |
| 7,174,286 B2 | 2/2007 | Martin et al. |
| 7,177,935 B2 | 2/2007 | Bradshaw et al. |
| 7,178,106 B2 | 2/2007 | Lamkin et al. |
| 7,184,866 B2 | 2/2007 | Squires et al. |
| 7,197,234 B1 | 3/2007 | Chatterton |
| 7,197,465 B1 | 3/2007 | Hu et al. |
| 7,199,885 B2 | 4/2007 | Dodge |
| 7,210,100 B2 | 4/2007 | Berger et al. |
| 7,212,296 B2 | 5/2007 | Dodge et al. |
| 7,212,661 B2 | 5/2007 | Samara et al. |
| 7,218,779 B2 | 5/2007 | Dodge et al. |
| 7,219,304 B1 | 5/2007 | Kraenzel et al. |
| 7,222,780 B2 | 5/2007 | Lapstun et al. |
| 7,225,040 B2 | 5/2007 | Eller et al. |
| 7,228,340 B2 | 6/2007 | De Boor et al. |
| 7,231,357 B1 | 6/2007 | Shanman et al. |
| 7,353,533 B2 | 4/2008 | Wright et al. |
| 7,363,347 B2 | 4/2008 | Thomas |
| 7,433,885 B2 | 10/2008 | Jones |
| 7,619,623 B2 | 11/2009 | Hoppe et al. |
| 8,054,598 B1 * | 11/2011 | Sadler et al. .................... 361/63 |
| 2004/0107273 A1 | 6/2004 | Biran et al. |
| 2004/0163001 A1 * | 8/2004 | Bodas .......................... 713/300 |
| 2006/0259621 A1 | 11/2006 | Ranganathan et al. |
| 2007/0250838 A1 * | 10/2007 | Belady et al. ................. 718/105 |
| 2008/0065919 A1 * | 3/2008 | Hatasaki et al. .............. 713/324 |
| 2008/0114997 A1 * | 5/2008 | Chin .............................. 713/321 |
| 2008/0141048 A1 | 6/2008 | Palmer et al. |
| 2009/0044036 A1 * | 2/2009 | Merkin ......................... 713/340 |
| 2009/0106571 A1 * | 4/2009 | Low et al. ..................... 713/310 |
| 2009/0125737 A1 * | 5/2009 | Brey et al. .................... 713/322 |
| 2009/0158072 A1 * | 6/2009 | Radhakrishnan et al. .... 713/340 |
| 2009/0187782 A1 * | 7/2009 | Greene et al. ................. 713/340 |
| 2009/0204916 A1 | 8/2009 | Benedek et al. |
| 2009/0231152 A1 * | 9/2009 | Tung et al. .................... 340/660 |
| 2009/0234512 A1 * | 9/2009 | Ewing et al. .................. 700/295 |
| 2009/0265568 A1 * | 10/2009 | Jackson ........................ 713/320 |
| 2010/0010857 A1 * | 1/2010 | Fadell ............................. 705/8 |
| 2010/0205469 A1 * | 8/2010 | McCarthy et al. ............ 713/324 |
| 2011/0010566 A1 * | 1/2011 | Bandholz et al. ............. 713/300 |

OTHER PUBLICATIONS

Madden, Brian, "Live blogging the VMworld 2009 keynote", dated Sep. 1, 2009.

VMware vCenter vserver "Unify and simplify virtualization management", 2009.

VMware white paper, "What is new in vmware vcenter server 4" dated Jul. 2, 2009.

International Preliminary Report on Patentability on PCT/US2010/043826 dated Apr. 5, 2012.

International Search Report on PCT/US2010/043826 dated Apr. 5, 2012.

International Search Report on PCT/US2010/043826 dated Apr. 13, 2011.

* cited by examiner

SYSTEMS AND METHODS FOR ATTRIBUTING AN AMOUNT OF POWER CONSUMPTION TO A WORKLOAD

FIELD OF THE DISCLOSURE

This disclosure generally relates to systems and methods for monitoring power consumption. In particular, this disclosure relates to systems and methods for attributing an amount of electrical power consumption to a workload.

BACKGROUND

As companies move towards environmentally responsible business practices, there is considerable interest in the management and optimization of power consumption in business machines. This movement is sometimes referred to as the "green" computing movement. Even from pure cost and constraints perspectives, the information technology industry recognizes the importance of managing and optimizing power usage in computing devices. In a conventional computing environment, power meters or sensors may be used to monitor the electrical power consumption of hardware. Power levels and computational loading may be monitored and then redistributed via various means across a plurality of hardware machines so as to minimize the carbon footprint while maintaining the same service levels. On an individual machine level, the state (e.g., active, inactive, hibernating or standby state) and power usage of the machine may also be monitored and managed in response to present or anticipated needs. Therefore, power monitoring systems are integral to the management of power usage. However, conventional environments do not provide analogous systems for monitoring the power usage of workloads such as virtual machines and/or other virtualized entities (e.g., virtualized applications and virtual desktop sessions) executing on a hardware machine. Workloads may further include software applications, web applications, terminal server sessions and operating system instances, and any of these may be executed by other workloads.

BRIEF SUMMARY

In one aspect, a method for attributing a portion of a level of electrical power consumption by a server to a workload executing on the server includes determining a level of electrical power consumption of a server. The method includes identifying a level of load placed on the server by a workload executing on the server. The method includes attributing, by a power apportionment module, a portion of the level of electrical power consumption of the server to the workload, based on the identified level of load. The method includes providing, by the power apportionment module, to a user, an identification of the attributed portion of the level of electrical power consumption.

In one embodiment, the method includes identifying the first level of load placed on the server by the first workload executing on the server, wherein a workload is one of: a software application, a web application, a virtual desktop, a terminal server session, a virtual machine, a virtualized application and an operating system instance. In another embodiment, the method includes determining that a second workload is executing in the first workload. In still another embodiment, the method includes identifying a second level of load placed on the first workload by second workload. In yet another embodiment, the power apportionment module attributes a portion of the attributed portion of the level of electrical power consumption to the second workload. In another embodiment, the power apportionment module provides to a user an identification of the portion of the attributed portion of the level of electrical power consumption.

In one embodiment, the method includes determining a level of electrical power consumption of the server prior to execution of the workload. In another embodiment, the method includes determining a level of electrical power consumption of the server during execution of the workload. In still another embodiment, the method includes determining a level of electrical power consumption of at least one physical component of the server. In yet another embodiment, the method includes measuring, by at least one sensor, the level of electrical power consumption of the server. In one embodiment, the method includes identifying a level of usage of a physical component of the server by the workload. In another embodiment, the method includes identifying a level of usage by the workload of at least one of memory, processor, communications input/output bandwidth, and disk input/output bandwidth.

In one embodiment, the method includes attributing a portion of the level of electrical power consumption of the at least one physical component of the server to the workload. In another embodiment, the method includes attributing a portion of the level of electrical power consumption of the server to the workload based on an identified level of electrical power consumption of the at least one physical component of the server to the workload. In still another embodiment, the method includes attributing a portion of the level of electrical power consumption of the server to the workload based on the determined level of electrical power consumption of the server. In yet another embodiment, the method includes attributing a portion of a nominal level of electrical power consumption of at least one physical component of the server to the workload. In some embodiments, the method includes attributing a portion of the level of electrical power consumption of the server to a consumer, the server executing the workload on behalf of the consumer.

In one embodiment, the method includes attributing a portion of the level of electrical power consumption of the server to the workload using at least one power consumption contribution model. In another embodiment, the method includes attributing a portion of the level of electrical power consumption of a physical component of the server to the workload using at least one power consumption contribution model. In still another embodiment, the method includes attributing a portion of the level of electrical power consumption of the server to the workload, the level of electrical power consumption including a portion of overhead electrical power consumption indirectly consumed by the workload.

In one embodiment, the method includes managing levels of electrical power consumption between a plurality of servers based on the identification of the attributed portion of the level of electrical power consumption. In another embodiment, the method includes managing levels of electrical power consumption on a plurality of workloads based on the identification of the attributed portion of the level of electrical power consumption of the workload, wherein the workload is one of the plurality of workloads. In still another embodiment, the method includes managing the levels of electrical power consumption on the plurality of workloads based on at least one of: a policy and a property of the plurality of workloads. In yet another embodiment, the method includes constraining the level of electrical power consumption of the plurality of workloads.

In another embodiment, the method includes managing levels of load between a plurality of servers based on the identification of the attributed portion of the level of electrical power consumption. In still another embodiment, the method includes adjusting levels of load between a plurality of servers based on the identification of the attributed portion of the level of electrical power consumption to meet service level requirements. In yet another embodiment, the method includes determining a chargeback amount for server resources consumed by the workload based on the identification of the attributed portion of the level of electrical power consumption. In still even another embodiment, the method includes determining a billing amount for server resources consumed by the workload based on the identification of the attributed portion of the level of electrical power consumption. In yet even another embodiment, the method includes determining a carbon footprint of the workload based on the identification of the attributed portion of the level of electrical power consumption.

In another aspect, a system for attributing a portion of a level of electrical power consumption by a server to a workload executing on the server includes a server executing a workload and identifying a level of load placed on the server by the workload. The system includes a power apportionment module attributing a portion of the level of electrical power consumption of the server to the workload, based on the identified level of load and providing, to a user, an identification of the attributed portion of the level of electrical power consumption.

In some embodiments, a workload is one of: a software application, a web application, a virtual desktop, a terminal server session, a virtual machine, a virtualized application and an operating system instance. In one embodiment, the workload comprises a hardware partition. In another embodiment, the power apportionment module determines that a second workload is executing in the first workload. In still another embodiment, the power apportionment module identifies a second level of load placed on the first workload by second workload. In yet another embodiment, the power apportionment module attributes a portion of the attributed portion of the level of electrical power consumption to the second workload. In still even another embodiment, the power apportionment module provides to a user an identification of the portion of the attributed portion of the level of electrical power consumption.

In one embodiment, the system includes at least one sensor measuring a level of electrical power consumption of at least one server. In another embodiment, the at least one sensor includes a sensor for measuring a level of electrical power consumption from the server's power supply. In still another embodiment, the at least one sensor includes a sensor for measuring a level of electrical power consumption of a physical component of the server. In yet another embodiment, the power apportionment module generates a report based on the identification of the attributed portion of the level of electrical power consumption. In still even another embodiment, the system includes an interface generated by the power apportionment module. In some embodiments, the interface dynamically displays the identification of the attributed portion of the level of electrical power consumption.

In one embodiment, the system includes a power consumption contribution model for attributing a portion of the level of electrical power consumption of the server to the workload. In another embodiment, the system includes a power consumption contribution model for attributing a portion of the level of electrical power consumption to the workload proportional to level of usage of a physical component of the server by the workload. In still another embodiment, the system includes a power consumption contribution model for attributing a portion of the level of electrical power consumption to the workload based on a level of usage of a physical component of the server by the workload. In yet another embodiment, the system includes a power consumption contribution model for attributing a portion of the level of electrical power consumption to the workload based on an incremental level of usage of a physical component of the server by the workload.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
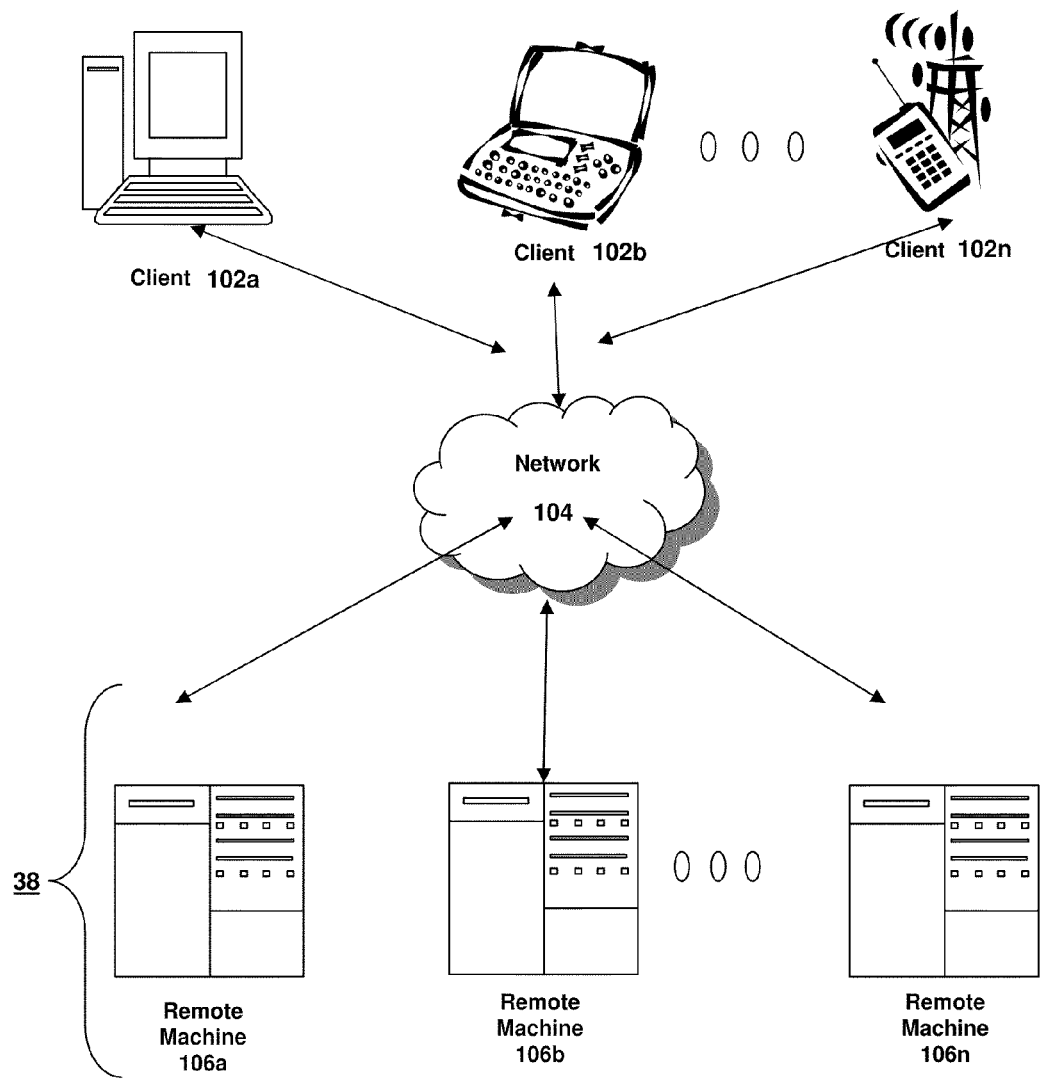
FIG. 1A is a block diagram depicting an embodiment of a network environment comprising client machines in communication with remote machines.

Referring now to FIG. 1A, an embodiment of a network environment is depicted. In brief overview, the network environment includes one or more clients 102a-102n (also generally referred to as local machine(s) 102, node(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node 102 seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38 or a machine farm 38. In another of these embodiments, the remote machines 106 may be geographically dispersed. In other embodiments, a server farm 38 may be administered as a single entity. In still other embodiments, the server farm 38 includes a plurality of server farms 38. The remote machines 106 within each server farm 38 can be heterogeneous—one or more of the remote machines 106 or machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

In one embodiment, remote machines 106 in the server farm 38 may be stored in high-density rack systems, along with associated storage systems, and located in an enterprise data center. In this embodiment, consolidating the remote machines 106 in this way may improve system manageability, data security, the physical security of the system, and system performance by locating remote machines 106 and high performance storage systems on localized high performance networks. Centralizing the remote machines 106 and storage systems and coupling them with advanced system management tools allows more efficient use of server resources.

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection. Additionally, a heterogeneous server farm 38 may include one or more remote machines 106 operating according to a type of operating system, while one or more other remote machines 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif., the Xen hypervisor, an open source product whose development is overseen by Citrix Systems, Inc., the VirtualServer, Hyper-V or virtual PC hypervisors provided by Microsoft, Linux KVM, or others.

In order to manage a server farm 38, at least one aspect of the performance of remote machines 106 in the server farm 38 should be monitored. Typically, the load placed on each remote machine 106 or the status of sessions running on each remote machine 106 is monitored. In some embodiments, a centralized service may provide management for server farm 38. The centralized service may gather and store information about a plurality of remote machines 106, respond to requests for access to resources hosted by remote machines 106, and enable the establishment of connections between client machines 102 and remote machines 106.

Alternatively, management of the server farm 38 may be de-centralized. For example, one or more remote machines 106 may comprise components, subsystems and modules to support one or more management services for the server farm 38. In one of these embodiments, one or more remote machines 106 provide functionality for management of dynamic data, including techniques for handling failover, data replication, and increasing the robustness of the server farm 38. Each remote machine 106 may communicate with a persistent store and, in some embodiments, with a dynamic store.

Remote machine 106 may be a file server, application server, web server, proxy server, appliance, network appliance, gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In some embodiments, a hypervisor executes on a remote machine 106 executing an operating system. In one of these embodiments, a remote machine 106 executing an operating system and a hypervisor may be said to have a host operating system (the operating system executing on the machine), and a guest operating system (an operating system executing within a computing resource partition provided by the hypervisor). In other embodiments, a hypervisor interacts directly with hardware on a remote machine 106, instead of executing on a host operating system. In one of these embodiments, the hypervisor may be said to be executing on "bare metal," referring to the hardware comprising the remote machine 106.

In one embodiment, a remote machine 106 may include a directory service, such as a MICROSOFT ACTIVE DIRECTORY service. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 includes an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application or virtualized application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In one embodiment, the remote machine 106 provides the functionality of a web server. In another embodiment, the remote machine 106a receives requests from the client 102, forwards the requests to a second remote machine 106b and responds to the request by the client 102 with a response to the request from the second remote machine 106b. In still another embodiment, a remote machine 106 acquires an enumeration of applications available to the client 102 and address information associated with a remote machine 106' hosting an application identified by the enumeration of applications. In yet another embodiment, the remote machine 106 presents a response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

In one embodiment, a computing device 100 may request resources from a remote machine 106, while providing the functionality of a remote machine 106 to a client 102b. In such an embodiment, the computing device 100 may be referred to as a client 102a with respect to data received from the remote machine 106 (which may be referred to as a server) and the computing device 100 may be referred to as a server 106 with respect to the client 102b. In another embodiment, the client 102 may request resources from the remote machine 106 on behalf of a user of the client 102.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME, CITRIX PRESENTATION SERVER, CITRIX XENAPP, CITRIX XENDESKTOP and/or any of the MICROSOFT WINDOWS Terminal Services manufactured by the Microsoft Corporation. In another embodiment, the application is an ICA client, developed by Citrix Systems, Inc., of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc., of Santa Clara, Calif., or Microsoft Office LIVE MEETING provided by Microsoft Corporation of Redmond, Wash.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2 Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
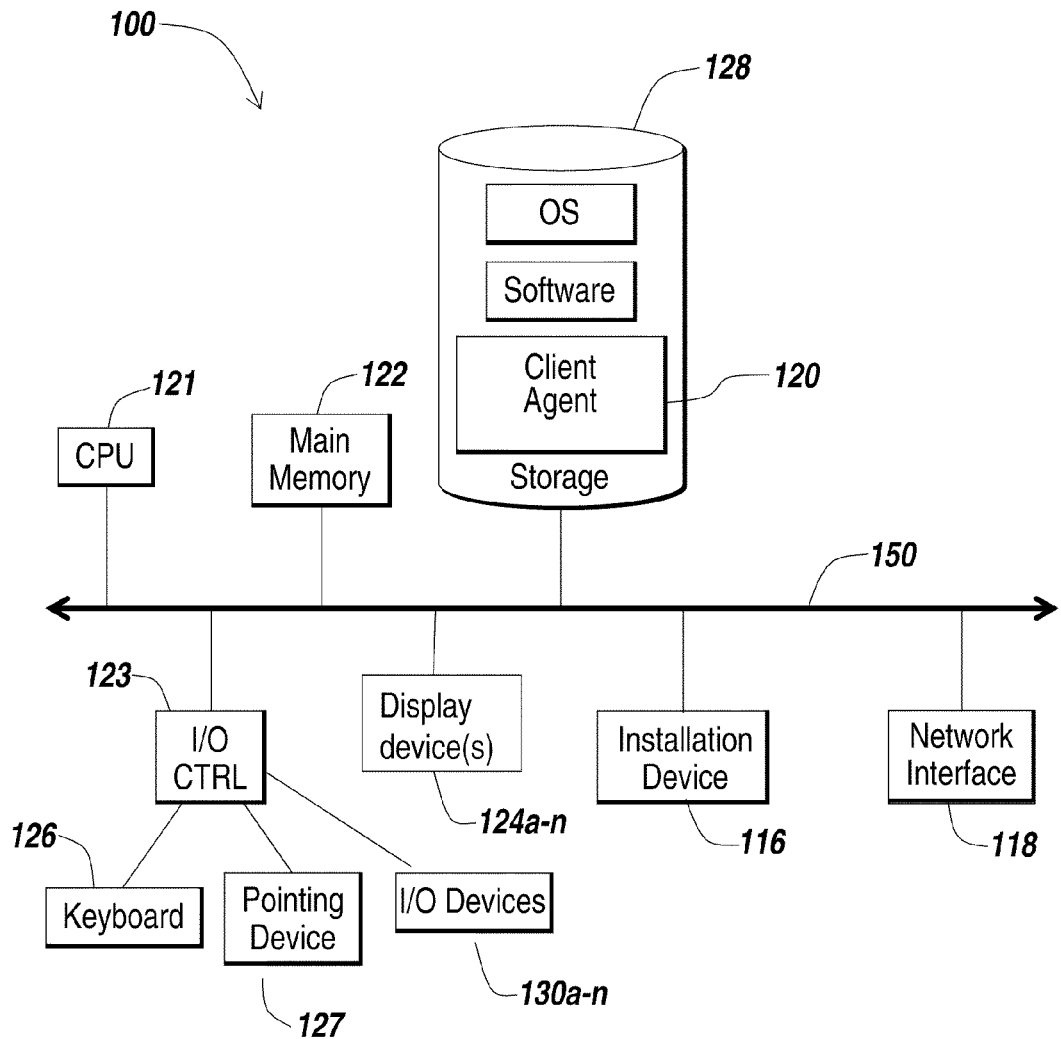
FIGS. 1B-1E are block diagrams depicting embodiments of computing devices useful in connection with the methods and systems described herein.
Figure 1C:
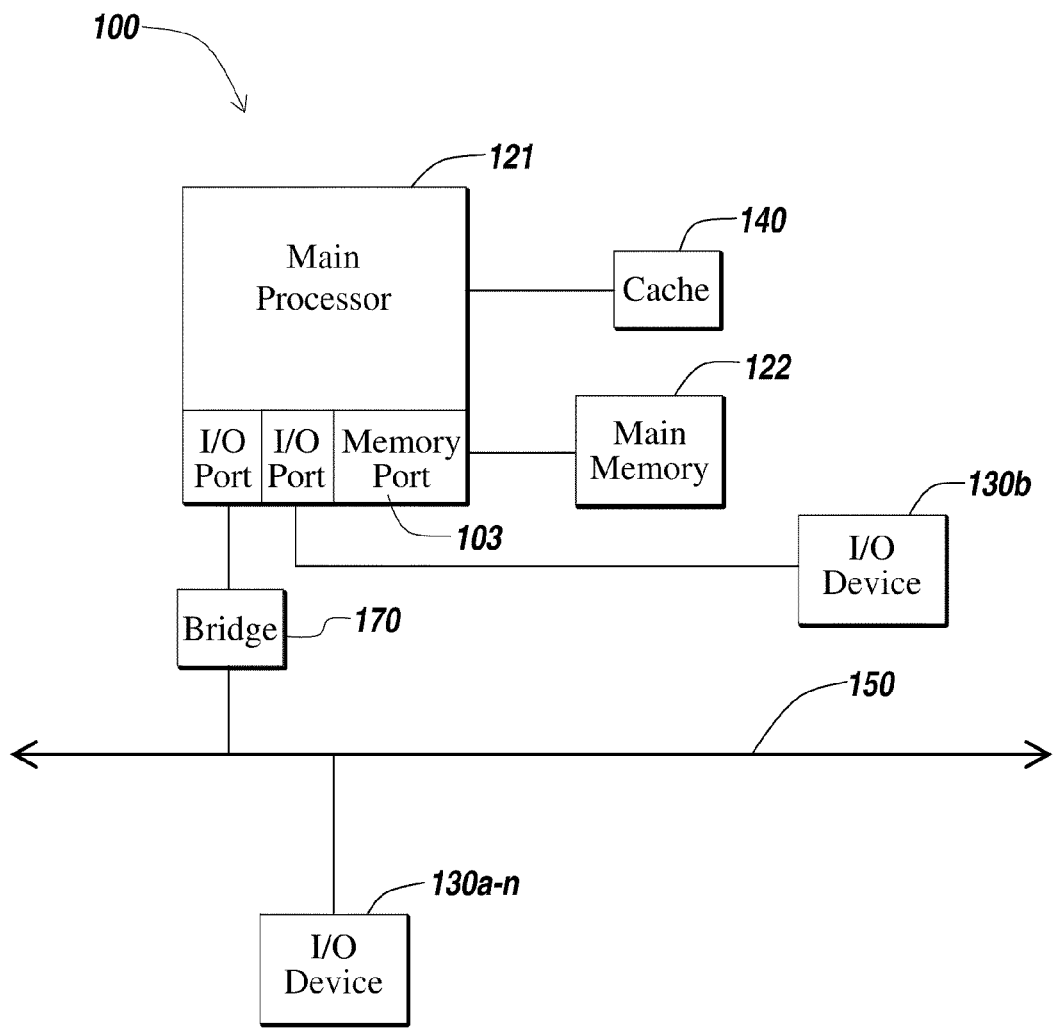

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

Figure 1D:
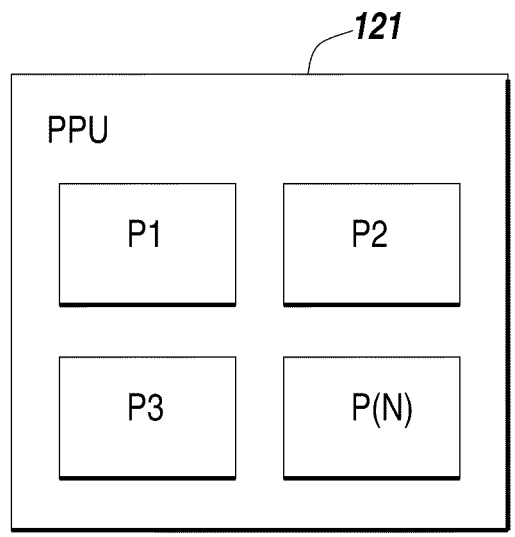

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
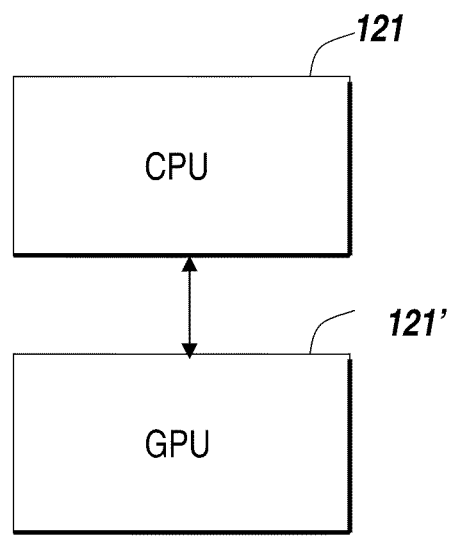

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 1F:
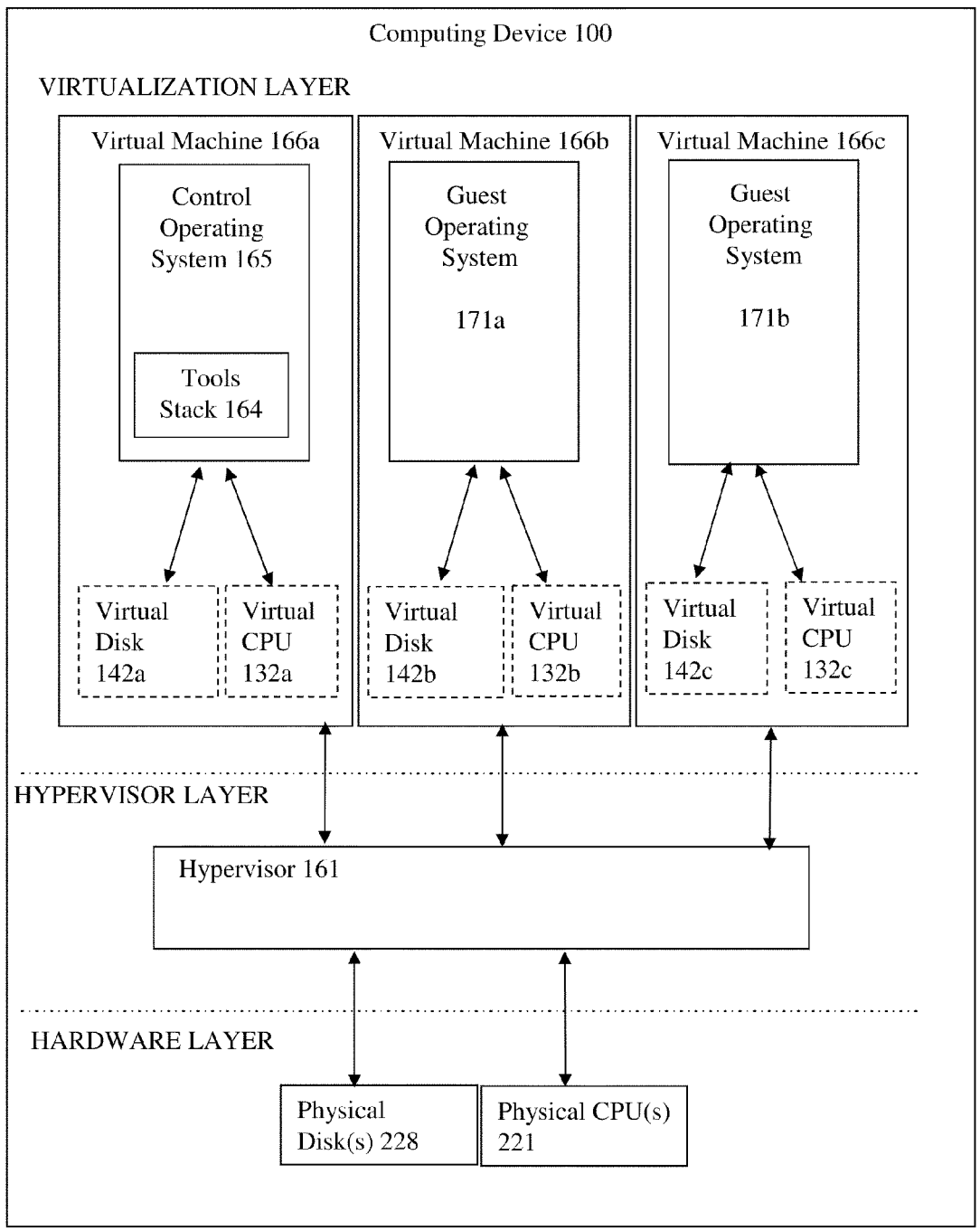
FIG. 1F is a block diagram depicting an embodiment of a virtualization environment.

Referring now to FIG. 1F, a block diagram depicts one embodiment of a virtualization environment. In brief overview, a computing device 100 includes a hypervisor layer, a virtualization layer, and a hardware layer. The hypervisor layer includes a hypervisor 161 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 165, 171a, 171b and a plurality of virtual resources allocated to the at least one operating system 165, 171a, 171b. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 165, 171a, 171b may be referred to as a virtual machine 166. A virtual machine 166 may include a control operating system 165 in communication with the hypervisor 161 and used to execute applications for managing and configuring other virtual machines on the computing device 100.

Referring now to FIG. 1F, and in greater detail, a hypervisor 161 may provide virtual resources to an operating system in any manner that simulates the operating system having access to a physical device. A hypervisor 161 may provide virtual resources to any number of guest operating systems 171a, 171b (generally 171). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 161 executes within an operating system executing on a computing device. In one of these embodiments, a computing device executing an operating system and a hypervisor 161 may be said to have a host operating system (the operating system executing on the computing device), and a guest operating system (an operating system executing within a computing resource partition provided by the hypervisor 161). In other embodiments, a hypervisor 161 interacts directly with hardware on a computing device, instead of executing on a host operating system. In one of these embodiments, the hypervisor 161 may be said to be executing on "bare metal," referring to the hardware comprising the computing device.

In some embodiments, a hypervisor 161 may create a virtual machine 166a-c (generally 166) in which an operating system 171 executes. In one of these embodiments, for example, the hypervisor 161 loads a virtual machine image to create a virtual machine 166. In another of these embodiments, the hypervisor 161 executes an operating system 171 within the virtual machine 166. In still another of these embodiments, the virtual machine 166 executes an operating system 171.

In some embodiments, the hypervisor 161 controls processor scheduling and memory partitioning for a virtual machine 166 executing on the computing device 100. In one of these embodiments, the hypervisor 161 controls the execution of at least one virtual machine 166. In another of these embodiments, the hypervisor 161 presents at least one virtual machine 166 with an abstraction of at least one hardware resource provided by the computing device 100. In other embodiments, the hypervisor 161 controls whether and how physical processor capabilities are presented to the virtual machine 166.

A control operating system 165 may execute at least one application for managing and configuring the guest operating systems. In one embodiment, the control operating system 165 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 161 executes the control operating system 165 within a virtual machine 166 created by the hypervisor 161. In still another embodiment, the control operating system 165 executes in a virtual machine 166 that is authorized to directly access physical resources on the computing device 100. In some embodiments, a control operating system 165a on a computing device 100a may exchange data with a control operating system 165b on a computing device 100b, via communications between a hypervisor 161a and a hypervisor 161b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 165 executes in a virtual machine 166 that is authorized to interact with at least one guest operating system 171. In another embodiment, a guest operating system 171 communicates with the control operating system 165 via the hypervisor 161 in order to request access to a disk or a network. In still another embodiment, the guest operating system 171 and the control operating system 165 may communicate via a communication channel established by the hypervisor 161, such as, for example, via a plurality of shared memory pages made available by the hypervisor 161.

In some embodiments, the control operating system 165 includes a network back-end driver for communicating directly with networking hardware provided by the computing device 100. In one of these embodiments, the network back-end driver processes at least one virtual machine request from at least one guest operating system 171. In other embodiments, the control operating system 165 includes a block back-end driver for communicating with a storage element on the computing device 100. In one of these embodiments, the block back-end driver reads and writes data from the storage element based upon at least one request received from a guest operating system 171.

In one embodiment, the control operating system 165 includes a tools stack 164. In another embodiment, a tools stack 164 provides functionality for interacting with the hypervisor 161, communicating with other control operating systems 165 (for example, on a second computing device 100b), or managing virtual machines 166b, 166c on the computing device 100. In another embodiment, the tools stack 164 includes customized applications for providing improved management functionality to an administrator of a virtual machine farm. In some embodiments, at least one of the tools stack 164 and the control operating system 165 include a management API that provides an interface for remotely configuring and controlling virtual machines 166 running on a computing device 100. In other embodiments, the control operating system 165 communicates with the hypervisor 161 through the tools stack 164.

In one embodiment, the hypervisor 161 executes a guest operating system 171 within a virtual machine 166 created by the hypervisor 161. In another embodiment, the guest operating system 171 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 171, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 161; in such an embodiment, the driver is typically aware that it executes within a virtualized environment.

In another embodiment, the guest operating system 171, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 165, as described above.

In conventional hardware systems, power consumption monitoring hardware, sensors and meters (hereinafter sometimes generally referred to as "sensor(s)") may be available or installed for monitoring electrical power usage. Such sensors may be used with any form or type of machines, including any embodiment of the computing device 100 or machine 106 described above in connection with FIGS. 1A-1F. In one embodiment, these sensors may also be installed in data center infrastructure such as server racks, blade chassis and industrial power supply and control hardware. In another embodiment, electrical power consumption monitoring hardware that attaches to power supply outlets or cords can be installed for use with hardware that does not comprise a power consumption sensor. In still another embodiment, these sensors can be used to measure the actual power consumed by an individual hardware machine/component or collection of hardware machines/components. In some embodiments, with knowledge of the mapping of information technology services to such hardware resources, one can monitor and estimate the amount of power used over time in providing any such workload or service. For example, two application programs executing on a server 106 may account for the bulk of the power consumption for that server 106. Another example of a workload is an operating system instance executing on a hardware machine. Other examples of workloads includes web applications and terminal server sessions executing on an operating system instance.

Coinciding with the "green" computing movement is a trend towards virtualization of hardware resources. For example, server and desktop hardware can be virtualized into virtual machines. In some embodiments, this may further extend to other data center components such as network switches, gateways and Storage Area Networks (SANs). In other embodiments, hardware resources are used in the provisioning of other forms of virtualization, such as virtualized applications and virtual desktop sessions (hereinafter sometimes generally referred to as "virtualized entities" or individually as a "workload"). Accordingly, as described herein, a workload may include, without limitation, any of: a software application or program, a web application, a virtual desktop, a terminal server session, a virtual machine, a virtualized application and an operating system instance.

In a broader sense, information technology is moving towards increasingly automated service-based management. For example, information technology services and desired service levels can be defined, and resources allocated to each such service. These workloads and service levels may be monitored and resources dynamically adjusted to ensure that desired levels are achieved. However, in such a complex system, determining the power consumed by the compute infrastructure specific to delivering a particular service may be challenging. For example, a server executing a bare metal hypervisor might be hosting a dynamic set of workloads (such as virtual machines) while each workload may be delivering some portion of a particular service. This disclosure provides a method and system to apportion the electrical power consumption of a hardware machine (or system) to the workloads the hardware machine (or system) executes.

Figure 2:
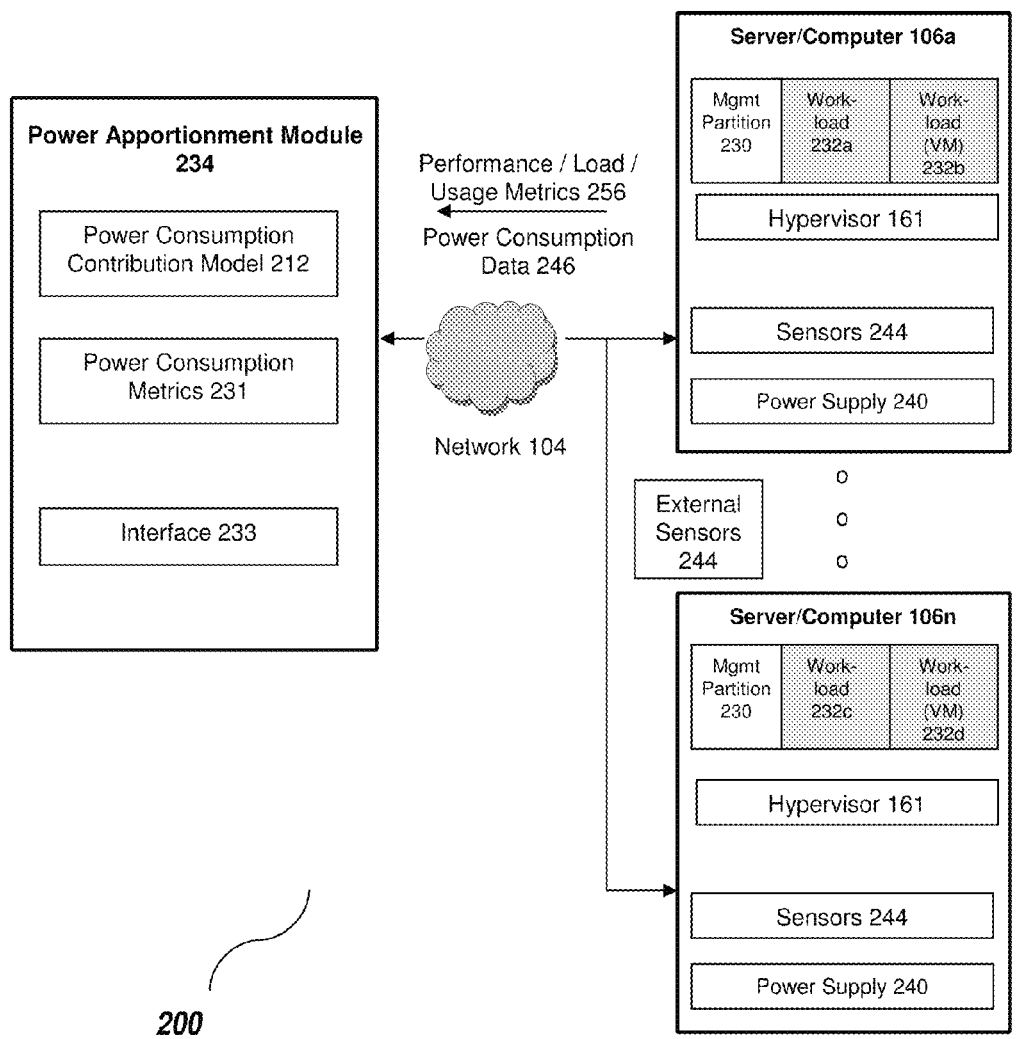
FIG. 2 is a block diagram depicting an embodiment of a system for attributing an amount of electrical power consumption to a workload.

Referring now to FIG. 2, a block diagram depicts an embodiment of a system 200 for attributing a level of electrical power consumption to a workload. In brief overview, the system includes an power apportionment module 234 in communication with one or more servers or computers 106a-n (hereinafter generally referred to as "server(s) 106") over one or more networks 104. Each of the servers 106 may be any embodiment of the computing device 100 or machine 106 described above in connection with FIGS. 1A-1F. Each server 106 may include a hypervisor 161 and provide one or more virtual machines 232 (workloads) as described above in connection with FIG. 1F; the virtual machines 232 may be virtual machines 166 as described above in connection with FIG. 1F. In some embodiments, virtualized entities such as virtual applications and virtual desktop sessions take the place of virtual machines 232. In some of these embodiments, the virtualized entities may operate and/or interface with other system components in the same manner or substantially the same manner as virtual machines 166.

In some embodiments, virtualized applications may be provided by application virtualization. In one of these embodiments, application virtualization isolates applications from the underlying operating system and from other applications, for example, to increase compatibility and manageability. In another of these embodiments, virtualization systems, such as CITRIX XENAPP, virtualizes applications via application streaming and isolation technology. In still another of these embodiments, applications are streamed from a centralized location into an isolation environment on the target device where they can execute as virtualized applications. In yet another of these embodiments, the application files, configuration, and settings are copied to the target device instead of an complete installation of the application on the target device. In one of these embodiments, the application execution at run-time is controlled by an application virtualization layer/environment on the target device. In another of these embodiments, the application runtime at execution interfaces with the virtualization layer/environment that proxies all requests to the operating system. In still another of these embodiments, the virtualized application consumes hardware resources on or associated with the target device.

In some embodiments, virtual desktop sessions, or virtual desktops, may be provided by virtualization systems such as CITRIX XENDESKTOP. In one embodiment, virtual desktop sessions provide one or more applications and/or one or more files in a desktop environment to a target device. In another embodiment, virtualization of a desktop session is the same or substantially the same as virtualization of an application. In still another embodiment, one or more applications provided by a virtual desktop session may be provided as virtualized applications. In yet another embodiment, a virtual desktop session executes on the target device. In some embodiments, a virtual desktop session consumes hardware resources on or associated with the target device. In one embodiment, a virtual desktop session is a virtual machine. In another embodiment, a virtual desktop session is part of a virtual machine.

In some embodiments, the workload 232 may be an application 232, such as a software application or program executing on the operating system of the server 106. In some of these embodiments, the application 232 may incorporate features from any embodiment of the applications described above in connection with FIG. 1A. In one embodiment, the application 232 is a web application executing on and provided by a web server 106. In another embodiment, the application 232 is software application or program downloaded an/or installed on the server 106. In another embodiment, the application 232 is a software application or program generated on the server 106, e.g., by another application. In still another embodiment, the application 232b may be a subprogram of application 232a.

In some embodiments, the workload 232 may be a terminal server (TS) session. Terminal server sessions may sometimes be referred to as terminal services sessions. In some of these embodiments, a TS session is a Remote Desktop Services session provided by MICROSOFT WINDOWS. In one embodiment, a TS session is an implementation of thin-client terminal server computing, where applications and/or desktops may be accessed remotely on a client machine. In another embodiment, the thin-client execution of a TS session on the client machine comprises a workload 232. In still another embodiment, the thin-client execution of a TS session on the client machine comprises a portion of a TS session workload 232.

In some embodiments, the workload 232 may be an operating system (OS) instance. In some of these embodiments, an OS instance may be an OS instance executing for a virtual machine. In other embodiments, an OS instance may be an OS executing on hardware (or bare metal). In one of these embodiments, a portion of overhead power consumption associated with a hardware machine executing non-OS workloads is attributed to the OS executing on the hardware machine. In another of these embodiments, a portion of power consumed by hardware other than the host machine (e.g. SANs and database servers) is attributed to the OS instance workload 232.

In one embodiment, the power apportionment module 234 monitors the power consumption of a server 106 executing a workload 232. In another embodiment, the power apportionment module 234 monitors at least one usage or load metric associated with the workload 232. In still another embodiment, the power apportionment module 234 uses the monitored power consumption metrics to attribute a portion of the power consumption of the server 106 to the workload 232. In yet another embodiment, the power apportionment module 234 makes the attributed power consumption available to various power management or reporting applications.

In one embodiment, the power apportionment module 234 monitors the power consumption of any hardware device or component in communication with a server 106 executing a workload 232. In another embodiment, the workload 232 utilizes some portion of hardware resources from the hardware device or component. In another embodiment, the power apportionment module 234 monitors at least one usage or load metric of the hardware device/component associated with the workload 232. In one embodiment, the hardware device may be a storage area network (SAN) or other shared storage. In another embodiment, the hardware device may be a switch (e.g., SAN switch), router, appliance, gateway or any other network device. In another embodiment, the hardware device may be any device (e.g., peripheral device) connected to the server on which a workload 232 is executing.

For example and in one embodiment, for each disk or disk array of a SAN, traffic levels or total allocated disk space for each Logical Unit (for example, a logical unit such as a Small Computer System Interface (SCSI), FibreChannel or Internet Small Computer System Interface (iSCSI) logical unit, identified by a logical unit number (LUN)) hosted by that disk or disk array may be monitored as a usage or load metric. In some embodiments, a server executing one or more workloads 232 may use some of the resources provided by the SAN.

In another embodiment, sensors or other measurement devices can measure the electrical power consumed by each disk or disk array. In still another embodiment, the power apportionment module 234 uses the monitored power consumption metrics to attribute a portion of the power consumption of the hardware device/component to the workload 232. In yet another embodiment, the power apportionment module 234 makes the attributed power consumption available to various power management or reporting applications.

Referring now to FIG. 2, and in one embodiment, the server 106 includes a power supply 240. In one embodiment, the power supply 240 may include any type or form of power storage device such as a battery. In another embodiment, the power supply 240 may include a power supply unit, such as one for converting alternating current electric power received from the mains into power suitable for use in the server 106. In still another embodiment, the power supply 240 may include electrical power generation means. For example, the power supply 240 may include elements for converting mechanical or chemical energy to electrical energy. In the latter embodiment, the power supply 240 may include a fuel cell.

In one embodiment, the power supply 240 resides in the server 106. In another embodiment, an external power supply 240 provides electrical power to the server components. In some embodiments, the server is powered by a plurality of power supplies 240. For example, in one of these embodiments, a first component of the server 106 is powered by a first power supply 240 and a second component of the server 106 is powered by a second power supply 240. In other embodiments, one power supply 240 may provide power to a plurality of servers 106. For example and in one embodiment, a plurality of server blades 106 may be powered by one or more power supplies 240 installed on a chassis encasing the server blades 106.

In one embodiment, each server 106 may execute at least one hypervisor 161. In another embodiment, each hypervisor 161 may provide one or more virtual machines 232. Embodiments of virtual machines 232 includes virtual servers. In still another embodiment, each server 106 may include a management partition 230 to partition and/or provide resources for supporting the one or more virtual machines 232, virtual desktop session, virtualized application or other workload. In yet another embodiment, the server 106 is a multi-core system as described above in connection with FIGS. 1D and 1E. For example and in one embodiment, each core of the multi-core system may execute a hypervisor 161 for providing at least one virtual machine 232. In another example, a virtualization system (e.g., CITRIX XENAPP) may provision a virtualized entity for execution on each core of the multi-core system.

In some embodiments, the hypervisor 161 on the server 106 is sometimes referred as a "type 1" or bare metal hypervisor, as described above in connection with FIG. 1F. In another embodiment, a computer or laptop 106b may operate substantially the same as one or more embodiments of the servers 106 described above in providing one or more virtual machines or virtualized entities. For example and in one embodiment, a computer or laptop 106b may execute a type 1 hypervisor 161 for providing one or more virtual machines 232. In other embodiments in which an operating system executed by the computer 106 executes the hypervisor 161, the hypervisor 161 may be referred as a type 2 hypervisor.

In some embodiments, a server 106 is an appliance. An appliance may be any type of network appliance, such as appliances manufactured by Citrix Systems, Inc., of Ft. Lauderdale, Fla. In one of these embodiments, the appliance may provide at least one service by executing at least one virtual server on the appliance.

In one embodiment, the server 106 includes at least one power consumption sensor 244. In another embodiment, a sensor 244 may be hardware or any combination of hardware and software. In still another embodiment, a sensor 244 may be designed and built to monitor, measure, track and/or report the power consumption of at least one server component. In yet another embodiment, a sensor 244 may be connected directly to an electrical power supply output. In one embodiment, a sensor may monitor power consumption via direct access to an electrical connection. In another embodiment, a sensor 244 may monitor power consumption via indirect means, such as sensing heat, temperature or electromagnetic radiation. In still another embodiment, a sensor 244 may estimate power consumption from at least one performance, load or usage metric associated with a server 106. In yet another embodiment, a sensor 244 may measure power consumption in any unit, such as BTU (British Thermal Unit), joules, kilowatt-hour (kWh), calories, ergs, or any variations thereof. In still even another embodiment, a sensor 244 may measure instantaneous power in any unit, such as watts or any variations thereof.

In one embodiment, the server 106 may include a sensor 244 for each electrical power supply 240. In another embodiment, the server 106 may include a sensor 244 for one or more physical components of the server 106. In still another embodiment, some components of the server 106 may each have a dedicated sensor 244. For example, each processing unit 121 of the server 106 may have its own integrated power consumption sensor 244. In one embodiment, a sensor 244 monitors the output of a power supply 240. In another embodiment, a sensor 244 monitors the power input into a server component. In still another embodiment, a sensor 244 monitors the external power input into a server 106.

In one embodiment, a sensor 244 may include functionality to transmit or report power consumption information to a server component (e.g., a processor 121). In one embodiment, a sensor 244 may include functionality to transmit or report power consumption information to an external device (e.g., a power apportionment module 234). In still another embodiment, a sensor 244 may store power consumption information in a storage device, such as any embodiment of storage device 122, 128, or 228 discussed above in connection with FIGS. 1A, 1B and 1F.

In one embodiment, a sensor 244 is installed on the chassis of a server 106. In another embodiment, a sensor 244 is interfaced with a power supply 240. In still another embodiment, a sensor 244 is installed in a chassis encasing or supporting a plurality of servers 106. In yet another embodiment, a sensor 244 is installed between a mains supply and the power input to at least one server 106. In some embodiments, a sensor 244 is integrated with a server component. For example and in one embodiment, a sensor 244 may be integrated with a power supply 240. In other embodiments, a sensor 244 may be integrated with a server motherboard. In still other embodiments, a sensor 244 is a separate server component. In some embodiments, a sensor 244 consumes some amount of overhead power during operation.

In one embodiment, one or more sensors 244 operate as part of a managed system. In some embodiments, a managed system describes the use of one or more management components (e.g., a baseboard management controller) installed on hardware (e.g., a computer 106) via an external management process (e.g., management access point) to communicate with monitor and control, operate or otherwise manage the hardware. In some of these embodiments, a managed system is based in part on infrastructure supporting, without limitation, the following standards: Common Information Model (CIM) as defined by Distributed Management Task Force (DMTF), Desktop and mobile Architecture for System Hardware (DASH), System Management Architecture for Server Hardware (SMASH), Active Management Technology (AMT), Intelligent Platform Management Interface (IPMI), integrated Lights-Out (iLO) and WS-Management.

In some embodiments, the sensor 244 supports a sensor profile such as the CIM Sensor Profile DSP1009 defined by the DMTF. In one of these embodiments, a sensor profile provides the capability to represent sensors in a managed system. In another of these embodiments, a sensor profile is a software API created for any sensor that can be interrogated by a program. For example and in one embodiment, DSP1009 specifies a set of CIM classes that may be implemented by CIM providers to provide an interface to power consumption sensors. These classes may define the properties and methods of sensors in a managed system.

In some embodiments, the sensor 244 and/or the power supply 240 supports a power supply profile. For example and in one embodiment, the sensor 244 and/or the power supply 240 supports features provided by the CIM Power Supply Profile DSP1015. In another embodiment, a power supply profile specifies the classes, properties, methods, and values that can be instantiated and manipulated to represent and manage power supplies of managed systems. For example and in one embodiment, DSP1015 provides representations of power consumption sensors and power production sensors for computer power supplies to measure power consumed by a server 106. In another embodiment, the specified classes may be accessed by CIM clients. In still another embodiment, the specified classes may be accessed via standards such as Web-Based Enterprise Management (WBEM), WS-Management and SMASH that can operate with CIM providers. In yet another embodiment, other management standards such as IPMI may also incorporate methods for accessing power consumption sensors. In still even another embodiment, the DMTF standards provide for sensors 244 that can measure actual power consumption by individual hardware components (e.g., a processor, a hard disk drive, or a network card).

In some embodiments, power consumption data 246 from a sensor 244 may be accessed via functionality provided by any of the standards described above. In one of these embodiments, the power apportionment module 234 accesses power consumption data 246 directly from a sensor 244. In another of these embodiments, the power apportionment module 234 accesses power consumption data 246 indirectly from a sensor 244, for example, via a baseboard management controller in communication with the sensor 244. In another embodiment, the power apportionment module 234 accesses power consumption data 246 via a baseboard management controller in communication with a storage device storing the power consumption data 246. Power consumption data 246 may be raw measurements of power consumption from sensors 244, or processed from these raw measurements. For example and in one embodiment, raw measurements are processed to isolate the electrical power consumption for each physical component of the server 106.

In some embodiments, power consumption data 246 from a sensor 244 may be accessed via functionality provided by a proprietary and/or custom framework. In one of these embodiments, the power apportionment module 234 may transmit a request to the sensor 244 for the power consumption data 246. In another of these embodiments, the power apportionment module 234 may transmit a request to a processing unit 121 maintaining or managing the power consumption data 246. In still another of these embodiments, the power apportionment module 234 may transmit a collection agent for execution on the server 106 to access the power consumption data 246 from a server component (e.g., sensor 244, storage device, processing unit 121, or baseboard management controller).

In one embodiment, power consumption data 246 may be collected over any specified period of time. In another embodiment, power consumption data 246 may be collected over the duration of an execution of a workload 232. In still another embodiment, power consumption data 246 may be collected before the execution of the workload 232. In yet another embodiment, power consumption data 246 may be collected after the termination of the execution of the workload 232. For example and in one embodiment, power consumption data 246 collected before the execution or after the termination of the execution of the workload 232 may be used as a baseline for comparison with power consumption data 246 collected while the workload 232 is executing.

In one embodiment, depending on the sensor configuration, power consumption data 246 may be collected for at least one of: a multi-server system (e.g., collection of server blades), a server 106 or a server component. In another embodiment, power consumption data 246 is collected in conjunction with usage, load or performance metrics 256 (hereinafter generally referred as "usage metric") corresponding to the same entities (i.e., the multi-server system, server 106 or server component). In still another embodiment, the power consumption data 246 is temporally mapped to the usage metrics 256. In yet another embodiment, usage metrics 256 corresponding to specified periods of time are extracted from monitoring records to coincide with that of the power consumption data. In some embodiments, usage metrics 256 may be estimated, extrapolated or determined for the time periods associated with the power consumption data.

In one embodiment, usage metrics 256 can include any data that represents the usage, loading and/or activity on a multi-server or multi-machine system, hardware machine, server 106, hardware/server component, or hardware partitions and compute fabrics (hereinafter generally referred as "hardware"). In one embodiment, a hardware partition may be a logical or physical partition of one or more hardware machines and/or components. In another embodiment, a hardware partition may represent a unit of resource and may, for example, be used for resource management purposes, such as allocation or budgeting purposes. For example and in one embodiment, a hardware partition may be assigned to one of a plurality of workloads (e.g., virtual machines) executing on a hardware server 106. In another embodiment, the one of a plurality of workloads 232 may utilize all or part of the assigned hardware partition. In one embodiment, compute fabrics includes one or more computers having multiples of hardware components. In another embodiment, compute fabrics can divide the hardware components into hardware partitions. In another embodiment, each hardware partition may operate as if it is an independent machine or computer.

In some embodiments, usage metrics 256 may be measured directly or indirectly, and may be (or incorporate) the result of processing (e.g., averaging or application of other functions) by any measuring or estimation system for usage, loading and/or activity related to any hardware. In one of these embodiments, a usage metric 256 can be associated with one or more workloads 232 executing on, or utilizing a hardware. In some embodiments, a workload 232 represents or comprises a hardware partition. In another of these embodiments, a usage metric 256 may represent an instantaneous or average utilization of the capacity of a memory device. In yet another of these embodiments, a usage metric 256 may represent an instantaneous or average utilization of the processing capacity of processor. In still another of these embodiments, a usage metric 256 may represent an instantaneous or average utilization of the input/output bandwidth at a communications interface or a disk interface. In some embodiments, a usage metric 256 may represent an instantaneous or average utilization of a combination of server resources and/or components.

In one embodiment, average utilization can be determined using any averaging technique or function, including but not limited to arithmetic mean, root-mean-square and mean weighted by resource type, exponential or logarithmic weighted averages, as applied to measurement samples. In another embodiment, average utilization can be determined using integration over a plotted utilization graph or a derived utilization function.

In some embodiments, a usage metric 256 may represent usage of a static or dynamically allocated resource. For example and in one embodiment, a hypervisor 161 may statically allocate an amount of memory to a virtual machine 232. In another embodiment, a multi-core system may allocate at least one processor core for each workload 232 it executes. In some embodiments, a usage metric 256 may be measured, calculated or otherwise determined by at least one of a server component and a program executing on the server 106.

In one embodiment, a power apportionment module 234 may access a usage metric 256 according to any of the standards discussed above in connection with operating a managed system. In another embodiment, a power apportionment module 234 may access a usage metric 256 using any proprietary and/or custom methods (e.g., using a collection agent executing on, or communicating with the hardware machine). In another embodiment, the power apportionment module 234 sends a request for the power consumption data 246 and/or the usage metrics 256. In still another embodiment, the request may be sent in response to a triggering event, such as a user directive or a detected change in a workload 232. In one embodiment, the power consumption data 246 and/or the usage metrics 256 may be automatically forwarded to a power apportionment module 234 according to a predetermined interval or schedule. In another embodiment, the power consumption data and/or the usage metrics 256 are automatically forwarded to a power apportionment module 234 in response to a predefined triggering event.

In one embodiment, a power apportionment module 234 may include hardware, or any combination of hardware and software. In another embodiment, a power apportionment module 234 is designed and constructed to provide functionality for apportioning a level of power consumption of a server 106 to a workload 232 executing on the server 106. In still another embodiment, a power apportionment module 234 performs the apportionment using the power consumption data 246 and the usage metrics 256. In one embodiment, a power apportionment module 234 may access the power consumption data 246 and/or the usage metrics 256 using features provided by any of the standards discussed above in connection with a managed system. In one embodiment, a power apportionment module 234 may access the power consumption data 246 and/or the usage metrics 256 using any proprietary and/or custom methods. In some embodiments, the power apportionment module 234 may access at least one power consumption contribution model 212 (hereinafter generally referred as "PCCM") in performing the power apportionment.

In one embodiment, the power apportionment module 234 includes a PCCM 212 for attributing a portion of the level of power consumption of the server 106 to the workload 232. In another embodiment, the power apportionment module 234 includes a PCCM 212 for attributing a portion of the level of power consumption to the workload 232 proportional to level of usage of a physical component of the server 106 by the workload 232. In still another embodiment, the power apportionment module 234 includes a PCCM 212 for attributing a portion of the level of power consumption to the workload 232 based on a level of usage of a physical component of the server 106 by the workload 232. In yet another embodiment, the power apportionment module 234 includes a PCCM 212 for attributing a portion of the level of power consumption to the workload 232 based on an incremental level of usage of a physical component of the server 106 by the workload 232.

In one embodiment, a PCCM 212 is defined to attribute a level of power consumption to a resource based on at least one usage metric 256 associated with the resource. A resource may be a workload 232, a hardware component or a hardware partition. In another embodiment, a PCCM 212 is designed to attribute a level of power consumption to a workload 232 based on at least one usage metric 256 associated with the workload 232. In still another embodiment, a plurality of PCCMs is available for supporting various combinations of sensors, power consumption data 246, usage metrics 256 and/or standards for supporting a managed system.

In one embodiment, a PCCM 212 may be defined and stored in any embodiment of storage devices 122, 128, 228 discussed above in connection with FIGS. 1A, 1B and 1F. In another embodiment, a PCCM 212 may reside in the power apportionment module 234. In still another embodiment, a PCCM 212 may reside in a network component accessible by the power apportionment module 234. In still another embodiment, a PCCM 212 may be part of a policy associated with a policy engine. In yet another embodiment, a PCCM 212 may be selected upon application of a policy by a policy engine (e.g., based on a power apportionment request by a user). In one embodiment, a PCCM 212 may be selected based in part on the power consumption data 246 and/or the usage metrics 256 received by the power apportionment module 234. In another embodiment, a PCCM 212 may be selected based in part on one or more standards and/or methods supported by the system. In still another embodiment, a PCCM 212 may use one of several mechanisms to apportion power consumption to a workload 232. Although illustratively described in the context of a server 106, it is understood that power apportionment can be applied to workloads 232 provided by any collection of servers 106 (e.g., a plurality of server blades contained in one chassis) or multi-core system.

In one embodiment, a first mechanism for apportioning server power consumption to a workload 232 uses the usage metrics 256 to apportion the total "host usage" in a server 106 to the workload 232 executing on the server 106 within an apportionment interval. In another embodiment, the usage metrics 256 includes a host usage metric for each workload 232. In still another embodiment, host usage is a metric representing a fraction of overall server resources utilized or occupied by a workload 232 during an specified interval. In yet another embodiment, once a portion of the total host usage has been attributed to a given workload 232, that portion is mapped to a portion of the server's power consumption during the same apportionment interval and attributed to the workload 232.

In some embodiments, the system may attribute some portion of the total host usage to overhead power consumption. In one of these embodiments, overhead power consumption may include power consumption associated with the use of resources for general management functions (e.g., associated with the operating system, use of sensors 244, or the hypervisor 161). In other embodiments, overhead power consumption is apportioned to each of the workload 232 executing on the server 106.

In one embodiment and by way of illustration, a simple PCCM 212 defines host usage as the workload's proportion of total memory utilization in a server 106. In another embodiment, the PCCM 212 maps the host usage directly to a portion of the server's power consumption. For example and in one embodiment, a virtual machine 232 that is allocated a quarter of the server's memory has a host usage of 25%. 25% of the server's power consumption is attributed to that virtual machine 232. In still another embodiment, a similar PCCM 212 can be applied in connection with a hypervisor 161 that statically allocates memory to executing workload 232. In yet another embodiment, this PCCM 212 can also be adapted for a hypervisor 161 that dynamically allocates memory to virtual machines 232 and reclaims memory from the virtual machines. In one embodiment, the proportion of allocated host memory is considered in the apportionment rather than the proportion of total host memory. In another embodiment, this may more accurately reflect the reality that a single workload 232 executing on a server 106 is the only workload 232 consuming power on the server 106, although the workload 232 may be allocated only a portion of the total host memory.

In another embodiment, a PCCM 212 may map utilization of processing capacity to host usage. In some of these embodiments, the PCCM 212 attributes a portion of the server's power consumption to this host usage. For example and in one embodiment, during an apportionment interval, the average processing capacity utilized is determined for each workload 232. In one embodiment, a workload's host usage is defined as the workload's share of aggregate processing capacity (overhead is shared amongst virtual machines). In another embodiment, a workload's host usage is defined as the workload's share of processing capacity use by all workloads 232 (overhead is excluded). The following example illustrates this:

| Workload | % of processing capacity | Host usage (Overhead separated out) | Fraction of server power consumption |
|---|---|---|---|
| A | 25 | 25/82 = 30.5% | 30.5% |
| B | 14 | 14/82 = 17.1% | 17.1% |
| C | 32 | 32/82 = 39.0% | 39.0% |
| Overhead | 11 | 11/82 = 13.4% | 13.4% |

If the overhead is distributed across the three workloads 232, the denominator in the Host Usage calculations would be the total processing capacity used by the three workloads 232 (i.e., 25+14+32=71). Accordingly, the overhead entry in the table can be removed or set to 0.

In some embodiments, a PCCM 212 may incorporate more than one usage metric. For example and in one embodiment, a PCCM 212 may include a weighted combination of CPU, memory, disk input/output bandwidth and network input/output bandwidth utilization. In another embodiment, a PCCM 212 may include a linear or nonlinear combination of at least one of: CPU, memory, disk input/output bandwidth and network input/output bandwidth utilization. In still another embodiment, a PCCM 212 may assign a different weight to each workload 232 when assigning host usage. Other variations can be supported, such as PCCMs that consider the identity of the users, the initiation sequence of the workload 232, the total duration of each workload 232, and the usage pattern of each workload 232.

In some embodiments, a PCCM 212 applies a model to determine the effect of incremental resource utilization to contributions in power consumption (i.e., instead of determining a single host usage metric for each workload 232). In one of these embodiments, the PCCM 212 may use a contribution model for each resource in determining contributions to power consumption. In one embodiment, the contribution model determines the incremental power consumption due to an incremental use of a particular server resource. In another embodiment, a base power consumption level may be dynamically determined to account for overhead consumption. In still another embodiment, each incremental power consumption is summed with the base power consumption to result in an attributed power consumption level for the particular workload 232.

By way of illustration and in one embodiment, a set of contribution models may indicate that server power consumption rises by 0.9 W for each additional 1% of processing capacity usage, and by 0.12 W for each additional 1% of disk usage. In another embodiment, a workload 232 (e.g., virtual machine 232) that utilizes 22% of processing capacity and 17% of disk usage during an apportionment period is attributed 22*0.9+17*0.12=21.84 W of additional power consumption. In still another embodiment, a base power consumption level may be derived from the power consumption of an idle server. In yet another embodiment, the base power consumption level may be determined from a version of the "host usage" approach to apportion overhead power to each workload 232. In other embodiments, a PCCM 212 may apply a plurality of usage metrics 256 in the set of contribution models.

The power consumption contribution models can be created by a number of ways. For example and in one embodiment, given the assumed form of the models (e.g. in the simplest case, that each one is a linear map from the appropriate metric to an additional power contribution value), measurements of the metrics required by the contribution model and corresponding power consumption levels can be subjected to standard statistical techniques such as regressions, principal components analysis or factor analysis to determine or infer parameters for a linear or nonlinear model. In another embodiment, one can drive the server resources across a range of load points to improve the modeling. For example, a procedure may include measuring power consumption while in "idle" state while keeping all usage metrics 256 as low as possible. Power consumption is also measured while incrementally driving each usage metric 256 up to full load and maintaining the other usage metrics 256 at the low levels. In other embodiments, sophisticated contribution models may take into account time-varying or temperature-related effects. For example and in one embodiment, contribution models may account for rapid increases in CPU power consumption with temperature. In another embodiment, contribution models may account for temperature increases with CPU load.

In some embodiments, a contribution model may be created by leveraging sensors 244 for servers where available. For example and in one embodiment, a server may have sensors 244 that measure the power consumption by each processor, hard disk drive, memory bank, expansion card, etc. In another embodiment, one can directly measure the incremental power consumption with incremental load on each such component. In another embodiment, one can generally assume a single-factor model for each component, simplifying the model creation. In still another embodiment, one can use interpolation between adjacent pairs of measured data points to overcome possible nonlinearity. In some embodiments, a combination of the model creation techniques discussed above may be used. For example and in one embodiment, where a full set of component power sensors is not available, one can use the first mechanism to determine power consumption not accounted for by the components that do have sensors.

In one embodiment, the power apportionment module 234 uses the at least one PCCM 212 to attribute a level of power consumption to a workload 232 based on the at least one usage metric 256. In another embodiment, the attributed level of power consumption is provided as a power consumption metric 231. In still another embodiment, the attributed level of power consumption is provided as a fraction or percentage of the total power consumption of a server 106. In one embodiment, the attributed level of power consumption may be updated responsive to a request. In another embodiment, the attributed level of power consumption may be updated dynamically and/or periodically. In still another embodiment, the attributed level of power consumption may be provided via an interface 233.

In one embodiment, the interface 233 can be a direct interface to a user, for example a command line interface, a graphical user interface, or a combination of both. In another embodiment, the interface 233 includes a reporting function for reporting power consumption metrics 232 to a user or application program. For example and in an embodiment, the interface 233 is a graphical dashboard for providing real-time power consumption metrics 232 to a user. In still another embodiment, the interface 233 can be implemented as an applications programming interface (API) to an existing program, for example, for reporting server metrics.

In one embodiment, the interface 233 can be implemented by modifying or shimming an existing management API. The management API may be modified or shimmed to support power consumption reporting. For example and in one embodiment, an existing management interface for virtual machines complies with CIM standards for "servers" (i.e., regardless of whether physical or virtual), but does not support power consumption metrics. This management interface may be shimmed, and the attributed power consumption metrics made available through the management interface by adding the appropriate sensor class instances (e.g., defined by DSP1009 & DSP1015) to the CIM class instances supported by the interface.

In some embodiments, the power apportionment module 234 includes a reporting module. In one embodiment, the power apportionment module 234 generates a power consumption report based on the identification of the attributed portion of the level of power consumption to a workload 232.

In another embodiment, the power apportionment module 234 dynamically displays, via the interface 233, the identification of the attributed portion of the level of power consumption. In still another embodiment, the power apportionment module 234 provides an attributed portion of the level of power consumption for determining at least one of: chargeback, billing, carbon footprint and resource allocation associated with a workload 232. In yet another embodiment, the power apportionment module 234 provides an attributed portion of the level of power consumption as a power consumption metric 231. In some embodiments, the attributed portion of the level of power consumption to some types of workloads 232, such as a virtual machine 232, is referred to as a synthetic metric. In one of these embodiments, the attributed portion of the level of power consumption to a virtual machine or virtualized entity is referred to as a synthetic metric. In another of these embodiments, the attributed portion of the level of power consumption to a virtual machine or virtualized entity is referred to as a synthetic metric because the attributed portion is inferred, derived or calculated rather than directly measured. By way of illustration and in one embodiment, the CPU load that a virtual machine or virtualized entity places on a bare metal server 106 is not a synthetic metric because the CPU load is directly measured.

In some embodiments, the power apportionment module 234 provides the attributed portion of the level of power consumption to a management system for managing, adjusting, distributing and/or optimizing power consumption between a plurality of servers 106 or processors. In one of these embodiments, the management system manages, adjusts, distributes and/or optimizes the levels of power consumption on a plurality of workloads 232 (e.g., virtual machines) based on the identification of the attributed portion of the level of power consumption of the workload 232, wherein the workload 232 is one of the plurality of workloads 232. In another of these embodiments, the management system manages, adjusts, distributes and/or optimizes the levels of power consumption based on at least one of: a policy and a property of the plurality of workloads 232. In one embodiment, the policy may be based on, but is not limited to one or more of the following: cost, network bandwidth, service level, network traffic, network load, power consumption pattern, billing and/or charge back requirements, and any attribute, property or characteristic associated with the plurality of workloads 232, the plurality of servers 106, the network 104, the power apportionment module 234 and the management system.

In some embodiments, a plurality of workloads 232 may execute on the server 106. In one of these embodiments, the plurality of workloads are of the same or substantially similar types (i.e., homogeneous). For example and in one embodiment, a hypervisor on the server provides a plurality of virtual machines 232. In another of these embodiments, the plurality of workloads comprises at least some workloads of differing types (i.e., heterogeneous). For example and in one embodiment, virtual machines and application programs execute on the server 106, each accounting for a portion of the level of power consumption. In other embodiments, one or more workloads may execute on a first workload executing on the server 106.

In one embodiment, if a workload does not execute in a virtual machine, the usage metrics for the workload 232 may be determined as described above in connection with FIG. 2. In other embodiments, multi-layered execution of workloads may be supported in accordance to the methods and systems described herein. In one embodiment, if a second workload (e.g., an OS instance) executes in a first workload (e.g., virtual machine), usage metrics for the second workload with respect to the first workload may be determined 106 by using and/or adapting the methods and systems described herein. In this embodiment, the power apportionment module 234 can identify, for the second workload, a portion of the level of power consumption attributed to the first workload. In another embodiment, if a second workload executes in a first workload, usage metrics for the second workload may be determined directly with respect to the host server 106 by using and/or adapting the methods and systems described herein. In a further example, a multi-layered workload may include an application executing on an OS instance of a virtual machine executing on a server 106.

In one embodiment, the management system constrains or limits the aggregate level of power consumption of the plurality of workloads 232. In another embodiment, the management system constrains or limits the level of power consumption of each of the plurality of workloads 232. In other embodiments, the power apportionment module 234 provides the attributed portion of the level of power consumption to a management system for managing, adjusting, distributing and/or optimizing load distribution between a plurality of servers 106 or processors.

In one embodiment, the power apportionment module 234 may provide power consumption reporting for a virtual machine 232 in substantially the same manner as a physical machine. In another embodiment, the power apportionment module 234 performs power consumption reporting for a virtual machine 232 in a different manner from a physical machine. In some embodiments, an administrator or management process accessing power consumption data through the power apportionment module 234 may or may not be able to differentiate between a virtual machine 232 and a physical machine.

Figure 3:
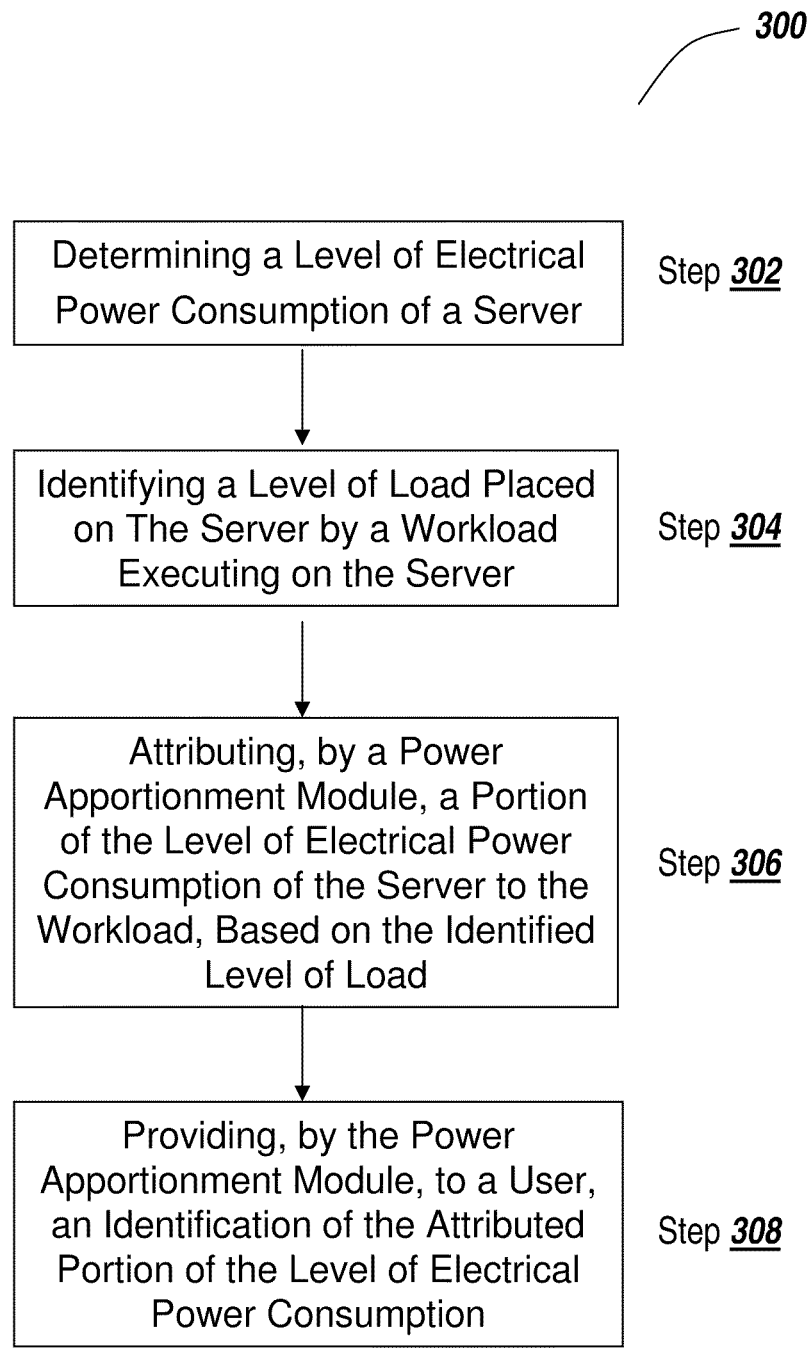
FIG. 3 is a flow diagram depicting one embodiment of a method for attributing an amount of electrical power consumption to a workload.

Referring now to FIG. 3, a flow diagram depicts one embodiment of the steps taken in a method 300 for attributing a portion of a level of power consumption by a server to a workload 232 executing on the server. The method includes determining a level of power consumption of a server (302). The method includes identifying a level of load placed on the server by a workload 232 executing on the server (304). The method includes attributing, by a power apportionment module in communication with the server, a portion of the level of power consumption of the server to the workload 232, based on the identified level of load (306). The method includes providing, by the power apportionment module, to a user, an identification of the attributed portion of the level of power consumption (308).

Referring now to FIG. 3, and in greater detail, the method includes determining a level of power consumption of a server (302). In one embodiment, a level of power consumption of the server is determined prior to execution of the workload 232. In another embodiment, a level of power consumption of the server is determined during execution of the workload 232. In still another embodiment, a level of power consumption of the server is determined after termination of the workload 232 (e.g., virtual machine 232). In yet another embodiment, a level of power consumption of at least one physical component of the server is determined. In some embodiments, at least one sensor 244 determines the level of power consumption. In some of these embodiments, at least one sensor 244 determines the level of power consumption by measuring the level of power consumption of the server.

In one embodiment, a sensor 244 measures the power consumption of at least one of: a collection of servers 106, a server 106, a hardware component of a server 106. In another embodiment, a sensor 244 measures the power output of at least one power supply 240. In still another embodiment, a sensor 244 measures the instantaneous power consumption. In yet another embodiment, a sensor 244 measures the average or total power consumption over a period of time (e.g., over a power apportionment period).

In one embodiment, the sensor 244 communicates the determined level of power consumption to a management component. For example and in an embodiment, the sensor 244 communicates the level of power consumption to a baseboard management controller. In another embodiment, the sensor 244 communicates the determined level of power consumption to a management process, module or interface. For example and in an embodiment, the sensor 244 communicates the level of power consumption to a service processor associated with a network device. In still another embodiment, the sensor 244 communicates the determined level of power consumption to a second server 106b. In yet another embodiment, the sensor 244 stores the level of power consumption in a storage device. In some embodiments, the sensor 244 communicates the level of power consumption using any of the standards discussed above in connection with a managed system.

In some embodiments, the determined level of power consumption is further processed by at least one of the following on the server 106: a virtualization system, a virtual desktop management system, a provisioning system processor, a hypervisor 161, a processor, a management process, and System (or Server) Management Utilities. In one embodiment, System (or Server) Management Utilities include, or are provided by, software applications such as MICROSOFT SCCM and SYMANTEC Altiris. For example, a first sensor 244a provides a first level of power consumption of a processor and a memory bank, while a second sensor 244b provides a second level of power consumption of the processor. The level of power of consumption of the memory bank may be determined by subtracting the second level of power from the first level of power. In some embodiments, the power apportionment module 234 receives processed power consumption data 246. In other embodiments, the power apportionment module 234 receives raw power consumption measurements 246 from a sensor 244.

In some embodiments, the method includes identifying a level of load placed on the server 106 by a workload 232 executing on the server 106 (304). In one embodiment, a hypervisor 161 identifies or determines a level of load placed on the server 106 by a workload 232 executing on the server 106. In another embodiment, a management partition 230 identifies or reports the level of load placed on the server 106. In still another embodiment, at least one of: a virtualization system, a virtual desktop management system and a provisioning system identifies the level of load placed on the server 106. In yet another embodiment, a management process/unit/interface, such as a service processor, identifies the level of load placed on the server 106 by the workload 232.

In one embodiment, identification of the level of load includes identifying a level of usage of the server 106 by the workload 232. In another embodiment, identification of the level of load includes identifying a level of usage of a physical component of the server 106 by the workload 232. In still another embodiment, identification of the level of load includes identifying a level of usage by the workload 232 of at least one of memory, processor, communications input/output bandwidth, and disk input/output bandwidth. In some embodiments, identification of the level of load includes identifying at least one of a level of usage, activity and performance associated with a collection of servers 106, a server 106 or a component of a server 106.

In one embodiment, a server component determines or provides the level of load on the server component due to a workload 232. In another embodiment, a management interface (e.g., baseboard management component) determines the level of load on a server component while in communication with the server component. In still another embodiment, usage metrics are determined from the level of load on the server 106. In one embodiment, usage metrics 256 are generated in the same context as the power consumption data 246. For example and in an embodiment, the same context includes a same time frame, such as a power apportionment period. In another embodiment, the same context refers to load and power consumption data determined for the same server component or resource. In still another embodiment, usage metrics are determined by at least one of the following on the server 106: a virtualization system, a virtual desktop management system, a provisioning system processor, a hypervisor 161, a processor, and a management interface.

In one embodiment, usage metrics 256 are communicated between server components, sensors, management interfaces, management processes and/or the power apportionment module 234 using at least one of the standards discussed above in connection with managed systems. In another embodiment, usage metrics 256 are communicated using a proprietary and/or custom framework. In still another embodiment, a collection agent executing on the server 106 transmits usage metrics 256 and/or power consumption data 246 to the power apportionment module 234. In yet another embodiment, usage metrics 256 and/or power consumption data 246 are cached or stored in a storage device accessible by the power apportionment module 234.

A power apportionment module attributes a portion of the level of power consumption of the server 106 to the workload 232 based on the identified level of load (306). In one embodiment, a power apportionment module in communication with the server 106 attributes a portion of the level of power consumption of the server 106 to the workload 232 based on the identified level of load. In another embodiment, a power apportionment module, in communication with any network component storing or otherwise providing usage metrics 256 and/or power consumption data 246, attributes a portion of the level of power consumption of the server 106 to the workload 232 based on the identified level of load. In still another embodiment, a power apportionment module, in communication with a storage device storing usage metrics 256 and/or power consumption data 246, attributes a portion of the level of power consumption of the server 106 to the workload 232 based on the identified level of load.

In one embodiment, the power apportionment module 234 attributes a portion of the level of power consumption of the server 106 to the workload 232 based on the level of load due to the workload 232. In another embodiment, the power apportionment module 234 attributes a portion of the power consumption to the workload 232 based on the usage metrics 256. In still another embodiment, the power apportionment module 234 attributes a portion of the power consumption to the workload 232 based on at least one of: the number of workloads 232 executing on the server 106, the level of load due to each workload 232, and the overhead power consumption. In yet another embodiment, the power apportionment module 234 attributes a portion of the power consumption during a specified period to the workload 232.

In some embodiments, the power apportionment module 234 attributes a portion of the power consumption to a workload 232 based on usage metrics 256 and power consumption data 246 determined within the same context. In one embodiment, the power apportionment module 234 attributes a portion of the level of power consumption of at least one physical component of the server to the workload 232. In another embodiment, the power apportionment module 234 attributes the portion of the level of power consumption of the physical component based on usage metrics 256 associated with the physical component.

In one embodiment, the power apportionment module 234 attributes a portion of the level of power consumption of the server to the workload 232 based on an identified level of power consumption of the at least one physical component of the server 106 to the workload 232. In another embodiment, the power apportionment module 234 attributes a portion of the level of power consumption of the server 106 to the workload 232 based on the determined level of power consumption of the server 106. In still another embodiment, the power apportionment module 234 attributes a portion of a nominal level of power consumption of at least one physical component of the server to the workload 232. For example and in an embodiment, the nominal power may be overhead power consumption or the idling state power consumption. In yet another embodiment, the power apportionment module 234 attributes a portion of the level of power consumption of the server 106 to the workload 232, the level of power consumption including a portion of overhead power consumption indirectly consumed by the workload 232.

In one embodiment, the power apportionment module 234 attributes a portion of the level of power consumption of the server 106 to the workload 232 using at least one power consumption contribution model 212. In another embodiment, the power apportionment module 234 attributes a portion of the level of power consumption of a physical component of the server 106 to the workload 232 using at least one power consumption contribution model 212. In still another embodiment, the power apportionment module 234 applies at least one power consumption contribution model 212 to the usage metrics 256 and/or power consumption data 246. In yet another embodiment, the power apportionment module 234 selects a power consumption contribution model 212 for attributing a portion of power consumption based on at least one of: the usage metrics 256, power consumption data 246, attributes of the associated server 106, attributes of the associated physical component 106, standards used by the managed system, and the configuration of sensors. In some embodiments, the power apportionment module 234 selects the PCCM 212 based on application of a policy by a policy engine.

In one embodiment, the PCCM 212 operates on usage metrics such as a host usage metric described above in connection with FIG. 2. In another embodiment, the PCCM 212 operates on usage metrics 246 such as an incremental level of usage described above in connection with FIG. 2. In still another embodiment, the PCCM 212 operates on raw measurements of levels of load (e.g., from server components) and/or levels of power consumption (e.g., from sensors 244). In yet another embodiment, the PCCM 212 uses statistical data based on loading and power consumption in attributing a portion of power consumption to the virtual server 232. In some embodiments, the power apportionment module 234 applies a plurality of PCCMs to attribute a portion of power consumption to the virtual server 232.

The power apportionment module provides an identification of the attributed portion of the level of power consumption (308). In one embodiment, the power apportionment module 234 provides the identification of the attributed portion of the level of power consumption via an interface 233. In another embodiment, the power apportionment module 234 generates or provides the interface 233. In still another embodiment, the power apportionment module 234 reports the attributed portion of the level of power consumption via a reporting module. In yet another embodiment, the power apportionment module 234 provides the attributed portion of the level of power consumption in response to a request for power apportionment. In some embodiments, the power apportionment module 234 provides the attributed portion of the level of power consumption responsive to receiving usage metrics 256 and/or power consumption data 246.

In one embodiment, the system 200 may manage the levels of power consumption between a plurality of servers 106 based on the identification of the attributed portion of the level of power consumption. In another embodiment, the system 200 manages the levels of load between a plurality of servers based on the identification of the attributed portion of the level of power consumption. In still another embodiment, the system 200 adjusts the levels of load and/or power consumption between a plurality of servers based on the identification of the attributed portion of the level of power consumption to meet service level requirements. In yet another embodiment, the system 200 optimizes the levels of load and/or power consumption between a plurality of servers 106 based on the identification of the attributed portion of the level of power consumption.

In some embodiments, the system 200 may use the attributed power consumption to set or enforce a power consumption limit or constraint on one or more workloads 232. In one of these embodiments, the system 200 sets or enforces a power consumption limit or constraint on each of the one or more workloads 232 based on a policy and/or a characteristic/property of the one or more workloads 232. In another of these embodiments, the system 200 sets or enforces a combined power consumption limit or constraint on all of the workloads 232 based on a policy and/or a characteristic/property of the workload 232. For example and in one embodiment, an administrator of a system 200 (or cloud computing provider) may manage a plurality of bare metal hypervisor servers 106. In another embodiment, the administrator may wish to constrain the power consumption of a plurality of workload 232 executed on behalf of a client. In still another embodiment, the administrator or client may be able to vary the number and type of workloads 232 for execution subject to the power consumption constraints.

In one embodiment, the system 200 may determine a chargeback amount for server resources consumed by the workload 232 based on the identification of the attributed portion of the level of power consumption. In another embodiment, the system 200 determines a billing amount for server resources consumed by the workload 232 based on the identification of the attributed portion of the level of power consumption. In still another embodiment, the system 200 determines a carbon footprint of the workload 232 based on the identification of the attributed portion of the level of power consumption. In yet another embodiment, the system 200 re-allocates resources to the workload 232 based on the identification of the attributed portion of the level of power consumption. In yet another embodiment, the system 200 migrates the workload 232 to a second server 106*b* based on the identification of the attributed portion of the level of power consumption on a first server 106*a*.

Figure 4:
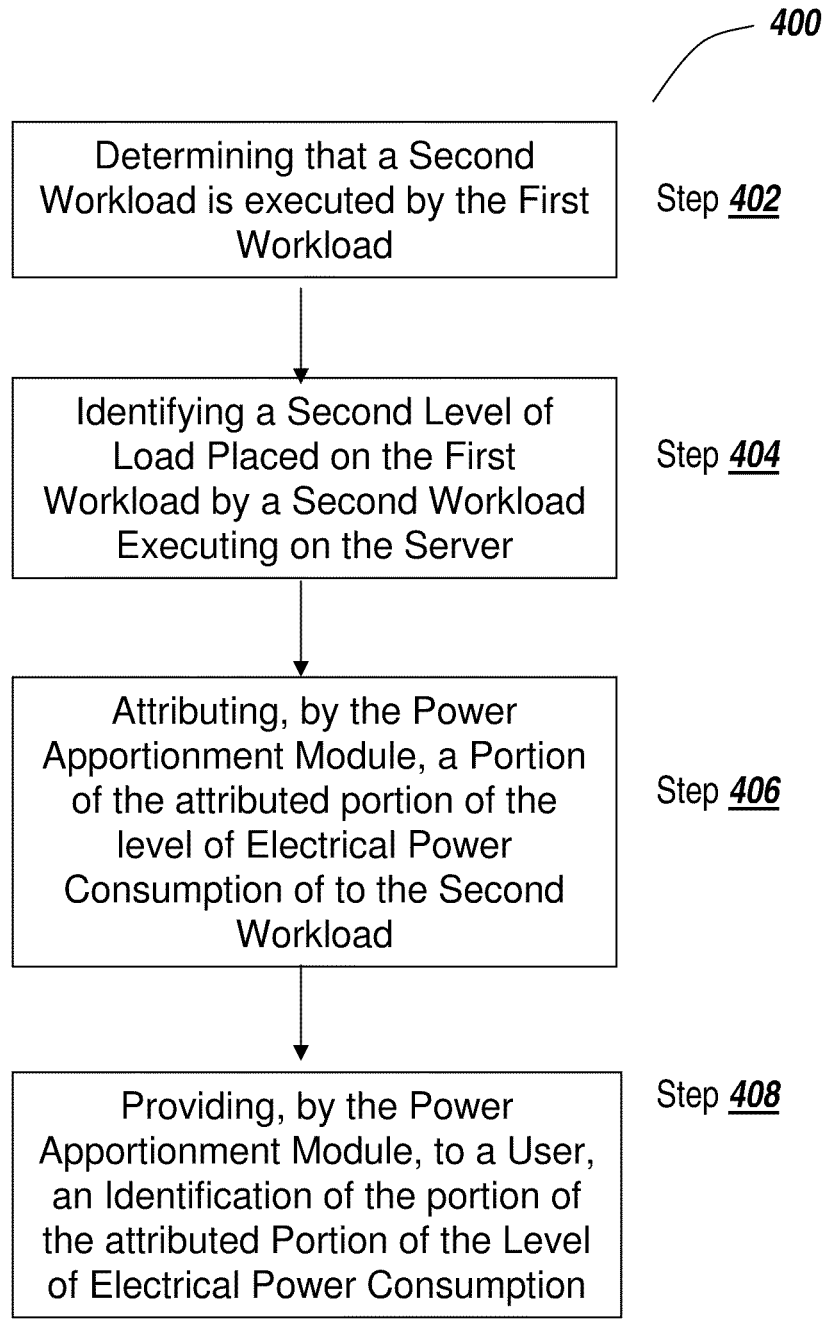
FIG. 4 is a flow diagram depicting another embodiment of a method for attributing an amount of electrical power consumption to a workload.

In some embodiments, one or more steps of the method can be applied and/or adapted to support power apportionment of workloads in a multi-workload, multi-layer execution scenario described above in connection with FIG. 2. Referring now to FIG. 4, a flow diagram depicts one embodiment of the steps taken in a method 300 for attributing a portion of a level of power consumption by a server to a second workload executed by a first workload. In brief summary, the method includes determining that a second workload is executed by the first workload (402), identifying a second level of load placed on the first workload by second workload (404), attributing, by the power apportionment module, a portion of the attributed portion of the level of power consumption to the second workload (406), and providing, by the power apportionment module, to a user, an identification of the portion of the attributed portion of the level of power consumption (408).

In some embodiments, the method includes determining that a second workload is executed by the first workload. In one embodiment, the method includes determining, by at least one of: a virtualization system, a virtual desktop management system, a provisioning system, a hypervisor 161, a processor, a management interface, the first workload, power apportionment module and the server 106, that a second workload is executed by the first workload. For example and in one embodiment, one entity (e.g., first workload) may communicate or share information with another entity (e.g., power apportionment module) to identify, determine, track or manage a plurality of workloads 232. In another embodiment, the power apportionment module 234 may determine a level of power consumption of the first workload, for example, using any embodiment of the process steps described above in connection with FIG. 3. In still another embodiment, the power apportionment module 234 may abstract or otherwise treat the first workload (e.g., a virtual machine) as a server on which the second workload executes.

In some embodiments, the method includes identifying a second level of load placed on the first workload by second workload. In one embodiment, the method includes identifying, by at least one of: a virtualization system, a virtual desktop management system, a provisioning system, a hypervisor 161, a processor, a management interface, the first workload, power apportionment module and the server 106, a second level of load placed on the first workload by second workload. In another embodiment, the identification of the second level of load may include any embodiment of steps discussed above in connection with (304) and FIG. 3.

In some embodiments, the method includes attributing, by the power apportionment module, a portion of the attributed portion of the level of power consumption to the second workload. In one embodiment, the method includes attributing, by at least one of: a virtualization system, a virtual desktop management system, a provisioning system, a hypervisor 161, a processor, a management interface, the first workload, a second power apportionment module 234*b* and the server 106, a portion of the attributed portion of the level of power consumption to the second workload. In another embodiment, the attribution of a portion of the attributed portion of the level of power consumption to the second workload may include any embodiment of steps discussed above in connection with (306) and FIG. 3.

In some embodiments, the method includes providing, by the power apportionment module, to a user, an identification of the portion of the attributed portion of the level of power consumption. In one embodiment, the method includes providing, by at least one of: a virtualization system, a virtual desktop management system, a provisioning system, a hypervisor 161, a processor, a management interface, the first workload, a second power apportionment module 234*b* and the server 106, to a user, an identification of the portion of the attributed portion of the level of power consumption. In another embodiment, the identification of the portion of the attributed portion of the level of power consumption may include any embodiment of steps discussed above in connection with (308) and FIG. 3. In still another embodiment, the power apportionment module 234 provides to a user an identification of the attributed portion of the level of power consumption for each workload 232. In yet another embodiment, the power apportionment module 234 provides an identification of groupings, subtotals, breakdowns and/or other arrangement of power apportionment data and/or results with respect to workloads at each layer.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for attributing a portion of a level of power consumption to a workload, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for attributing a portion of a level of electrical power consumption by a first server to a workload executing on the first server, the method comprising:
   determining a level of electrical power consumption of a first server by a plurality of workloads executing on the first server;
   identifying a level of load placed on the first server by a workload of the plurality of workloads executing on the first server, as a fraction of total load placed on the first server by the plurality of workloads;
   attributing, by a power apportionment module, a portion of the level of electrical power consumption of the first server to the workload, based on the identified level of load;
   providing, by the power apportionment module, an identification of the portion of the level of electrical power consumption attributed to the workload of the plurality of workloads; and
   migrating the workload to a second server based on the identification of the attributed portion of the level of electrical power consumption.

2. The method of claim 1 wherein identifying further comprises identifying the first level of load placed on the first server by the workload executing on the first server, wherein a workload is one of: a software application, a web application, a virtual desktop, a terminal server session, a virtual machine, a virtualized application and an operating system instance.

3. The method of claim 1 further comprising:
   determining that a second workload is executed by the workload;
   identifying a second level of load placed on the workload by the second workload;
   attributing, by the power apportionment module, a portion of the attributed portion of the level of electrical power consumption to the second workload; and
   providing, by the power apportionment module, to a user, an identification of the portion of the attributed portion of the level of electrical power consumption.

4. The method of claim 1, wherein determining further comprises determining a level of electrical power consumption of the first server prior to execution of the workload.

5. The method of claim 1, wherein determining further comprises determining a level of electrical power consumption of the first server during execution of the workload.

6. The method of claim 1, wherein determining further comprises determining a level of electrical power consumption of at least one physical component of the first server.

7. The method of claim 6, wherein attributing further comprises attributing a portion of the level of electrical power consumption of the at least one physical component of the first server to the workload.

8. The method of claim 6, wherein attributing further comprises attributing a portion of the level of electrical power consumption of the first server to the workload based on an determined level of electrical power consumption of the at least one physical component of the first server to the workload.

9. The method of claim 1, wherein determining further comprises measuring, by at least one sensor, the level of electrical power consumption of the first server.

10. The method of claim 1, wherein identifying further comprises identifying a level of usage of a physical component of the first server by the workload.

11. The method of claim 1, wherein identifying further comprises identifying a level of usage by the workload of at least one of memory, processor, communications input/output bandwidth, and disk input/output bandwidth.

12. The method of claim 1, wherein attributing further comprises attributing a portion of the level of electrical power consumption of the first server to the workload based on the determined level of electrical power consumption of the first server.

13. The method of claim 1, wherein attributing further comprises attributing a portion of a nominal level of electrical power consumption of at least one physical component of the first server to the workload.

14. The method of claim 1, wherein attributing further comprises attributing a portion of the level of electrical power consumption of the first server to the workload using at least one electrical power consumption contribution model.

15. The method of claim 1, wherein attributing further comprises attributing a portion of the level of electrical power consumption of a physical component of the first server to the workload using at least one power consumption contribution model.

16. The method of claim 1, wherein attributing further comprises attributing a portion of the level of electrical power consumption of the first server to the workload, the level of electrical power consumption including a portion of overhead electrical power consumption indirectly consumed by the workload.

17. The method of claim 1, wherein attributing further comprises attributing a portion of the level of electrical power consumption of the first server to a consumer, the first server executing the workload on behalf of the consumer.

18. The method of claim 1 further comprising managing levels of electrical power consumption between a plurality of servers based on the identification of the attributed portion of the level of electrical power consumption.

19. The method of claim 1 further comprising managing levels of electrical power consumption on a plurality of workloads based on the identification of the attributed portion of the level of electrical power consumption of the workload, wherein the workload is one of the plurality of workloads.

20. The method of claim 1 further comprising managing the levels of electrical power consumption on the plurality of workloads based on at least one of: a policy and a property of the plurality of workloads.

21. The method of claim 20 further comprising constraining the level of electrical power consumption of the plurality of workloads.

22. The method of claim 1 further comprising managing levels of load between a plurality of servers based on the identification of the attributed portion of the level of electrical power consumption.

23. The method of claim 1 further comprising adjusting levels of load between a plurality of servers based on the identification of the attributed portion of the level of electrical power consumption to meet service level requirements.

24. The method of claim 1 further comprising determining a chargeback amount for server resources consumed by the workload based on the identification of the attributed portion of the level of electrical power consumption.

25. The method of claim 1 further comprising determining a billing amount for server resources consumed by the workload based on the identification of the attributed portion of the level of electrical power consumption.

26. The method of claim 1, further comprising determining a carbon footprint of the workload based on the identification of the attributed portion of the level of electrical power consumption.

27. A system for attributing a portion of a level of electrical power consumption by a first server to a workload executing on the first server comprising:
a first server executing a workload and identifying a level of load placed on the first server by the workload of the plurality of workloads, as a fraction of total load placed on the first server by the plurality of workloads; and
a power apportionment module attributing a portion of the level of electrical power consumption of the first server to the workload, based on the identified level of load, providing an identification of the portion of the level of electrical power consumption attributed to the workload of the plurality of workloads, and migrating the workload to a second server based on the identification of the attributed portion of the level of electrical power consumption.

28. The system of claim 27, wherein a workload is one of: a software application, a web application, a virtual desktop, a terminal server session, a virtual machine, a virtualized application and an operating system instance.

29. The system of claim 27, wherein the power apportionment module further comprises:
means for determining that a second workload is executing in the workload;
means for identifying a second level of load placed on the workload by the second workload;
means for attributing a portion of the attributed portion of the level of electrical power consumption to the second workload; and
means for providing to a user an identification of the portion of the attributed portion of the level of electrical power consumption.

30. The system of claim 27, wherein the workload comprises a hardware partition.

31. The system of claim 27 further comprising at least one sensor measuring a level of electrical power consumption of at least one server.

32. The system of claim 31, wherein the at least one sensor includes a sensor for measuring a level of electrical power consumption from the first server's power supply.

33. The system of claim 31, wherein the at least one sensor includes a sensor for measuring a level of electrical power consumption of a physical component of the first server.

34. The system of claim 27, wherein the power apportionment module generates a report based on the identification of the attributed portion of the level of electrical power consumption.

35. The system of claim 27 further comprising an interface generated by the power apportionment module, the interface dynamically displaying the identification of the attributed portion of the level of electrical power consumption.

36. The system of claim 27, wherein the power apportionment module further comprises a power consumption contribution model for attributing a portion of the level of electrical power consumption of the first server to the workload.

37. The system of claim 27, wherein the power apportionment module further comprises a power consumption contribution model for attributing a portion of the level of electrical power consumption to the workload proportional to level of usage of a physical component of the first server by the workload.

38. The system of claim 27, wherein the power apportionment module further comprises a power consumption contribution model for attributing a portion of the level of electrical power consumption to the workload based on a level of usage of a physical component of the first server by the workload.

39. The system of claim 27, wherein the power apportionment module further comprises a power consumption contribution model for attributing a portion of the level of electrical power consumption to the workload based on an incremental level of usage of a physical component of the first server by the workload.

* * * * *